(12) United States Patent
Draving et al.

(10) Patent No.: US 7,480,355 B2
(45) Date of Patent: Jan. 20, 2009

(54) METHOD FOR EQUALIZING A DIGITAL SIGNAL THROUGH REMOVAL OF DATA DEPENDENT JITTER

(75) Inventors: Steven D Draving, Loveland, CO (US); Allen Montijo, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 642 days.

(21) Appl. No.: 11/059,007

(22) Filed: Feb. 16, 2005

(65) Prior Publication Data

US 2006/0182205 A1    Aug. 17, 2006

(51) Int. Cl.
    H04L 1/00    (2006.01)
(52) U.S. Cl. .................................. 375/346
(58) Field of Classification Search ............... 375/346, 375/226, 285, 227, 142, 143, 144, 148, 150, 375/152, 316, 343; 702/57, 69; 714/744, 714/52; 341/51; 327/156; 370/516; 348/497; 455/63.1, 114.2, 278.1, 296

See application file for complete search history.

(56) References Cited

U.S. PATENT DOCUMENTS

| | | | | |
|---|---|---|---|---|
| 6,137,283 A * | 10/2000 | Williams et al. | ......... | 324/76.12 |
| 6,271,773 B1 * | 8/2001 | Kobayashi | ............ | 341/51 |
| 6,507,790 B1 * | 1/2003 | Radomski | ............ | 702/39 |
| 7,203,610 B2 * | 4/2007 | Tabatabaei et al. | ........ | 702/69 |
| 7,254,168 B2 * | 8/2007 | Guenther | ............ | 375/226 |
| 2004/0153883 A1 * | 8/2004 | Miller et al. | ............ | 714/52 |
| 2006/0093027 A1 * | 5/2006 | Draving et al. | ............ | 375/226 |

FOREIGN PATENT DOCUMENTS

| EP | 492798 A2 * | 7/1992 |
|---|---|---|
| EP | 921402 A * | 6/1999 |

OTHER PUBLICATIONS

Yamaguchi et al., "Extraction of Instantaneous and RMS Sinusoidal Jitter Using an Analytic Signal Method" IEEE Transactions on Circuit and Systems II; Analog and Digital Signal Processing, vol. 50, No. 6, Jun. 2003 pp. 288-298.*

Verspecht, "Compensation of Timing Jitter-Induced Distortion of Sampled Waveforms", IEEE Transactions in Instrumentation and Measurement, vol. 43, No. 5, Oct. 1994 pp. 726-732.*

* cited by examiner

*Primary Examiner*—Sam K Ahn

(57) ABSTRACT

Equalized Acquisition Record are prepared from Original Acquisition Records reflecting Total Jitter and from an existing description of DDJ. Removal of timing DDJ alters the locations of edges associated with data events. Voltage DDJ adjusts the asserted voltage in the central portion of a Unit Interval. One technique for equalizing timing jitter variably interpolates along the existing Original Acquisition Record to discover plausible new voltage values to assign to existing sample locations along the time axis. Another technique construes the desired amount of correction for each data event as an impulse that is applied to a Finite Impulse Response Filter whose output is a Voltage Correction Waveform having a smoothed voltage excursion. Time variant voltage values output from the Finite Impulse Response Filter are collected into a Voltage Correction Waveform Record having entry times found in the Original Acquisition Record. An entry by entry addition of these two Records produces the Equalized Acquisition Record.

8 Claims, 15 Drawing Sheets

A DDJ TIMING EQUALIZATION PARADIGM

SIMPLE TIME SHIFTED INTERPOLATION TO EQUALIZE DDJ TIMING JITTER (ADV.)

HOW EQUALIZATION DISCONTINUITIES CAN ARISE WITH SIMPLE TIME SHIFTED INTERPOLATION

FILTERED TIME SHIFTED INTERPOLATION

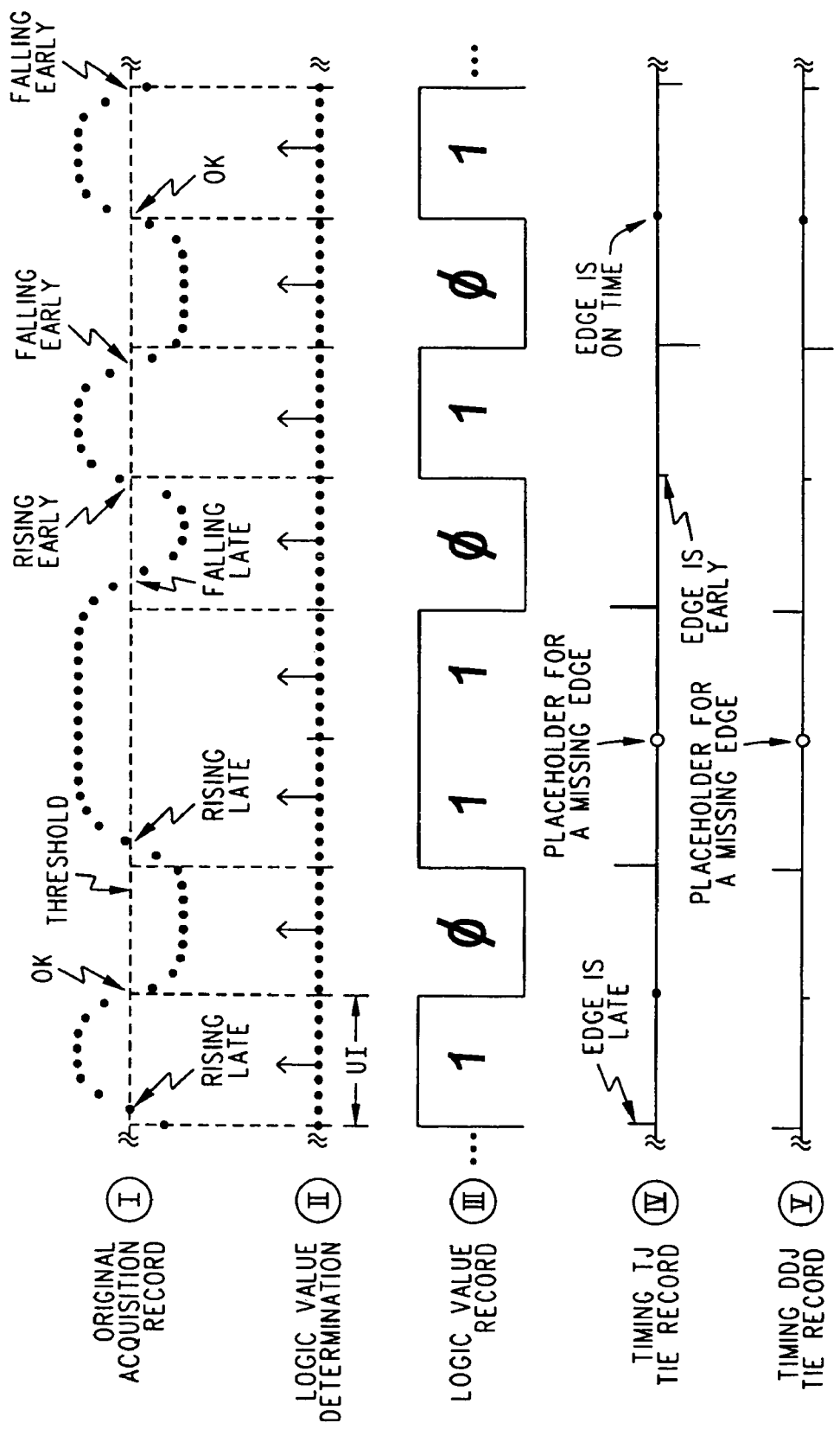

TIMING DDJ EQUALIZATION USING FILTERED TIME SHIFTED INTERPOLATION

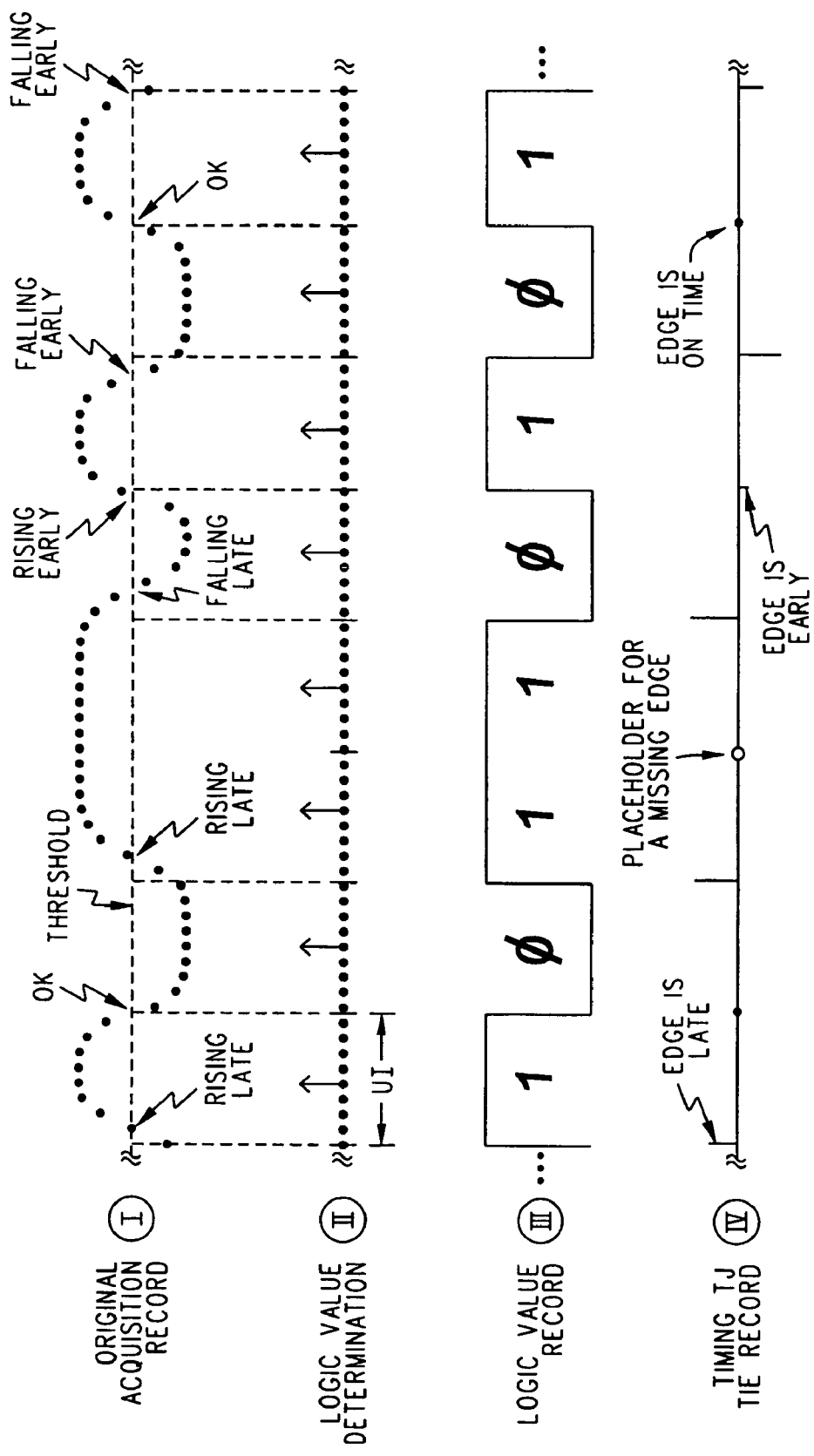

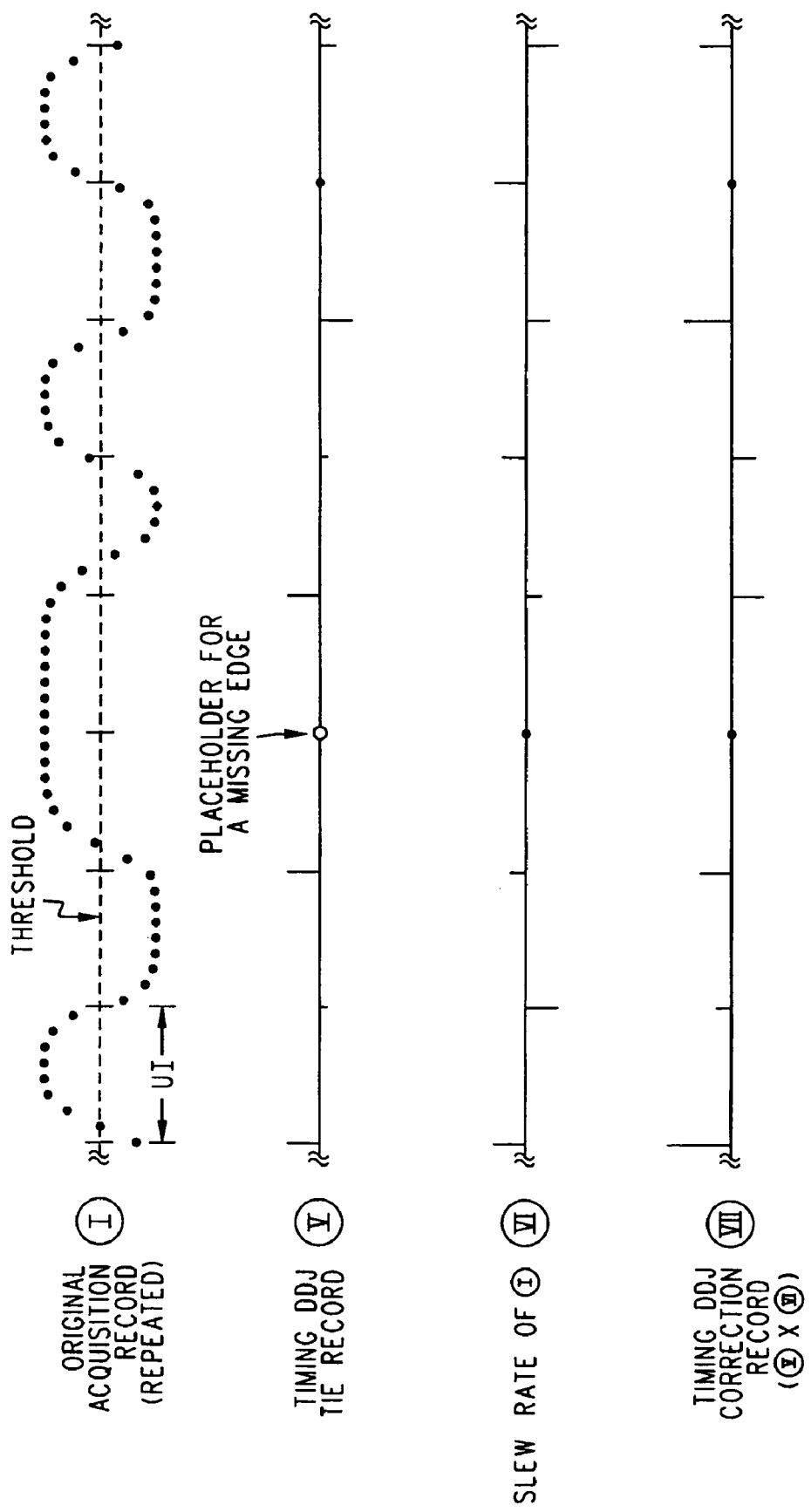
FIG. 8B  TIMING DDJ EQUALIZATION USING A COMPENSATORY VOLTAGE WAVEFORM

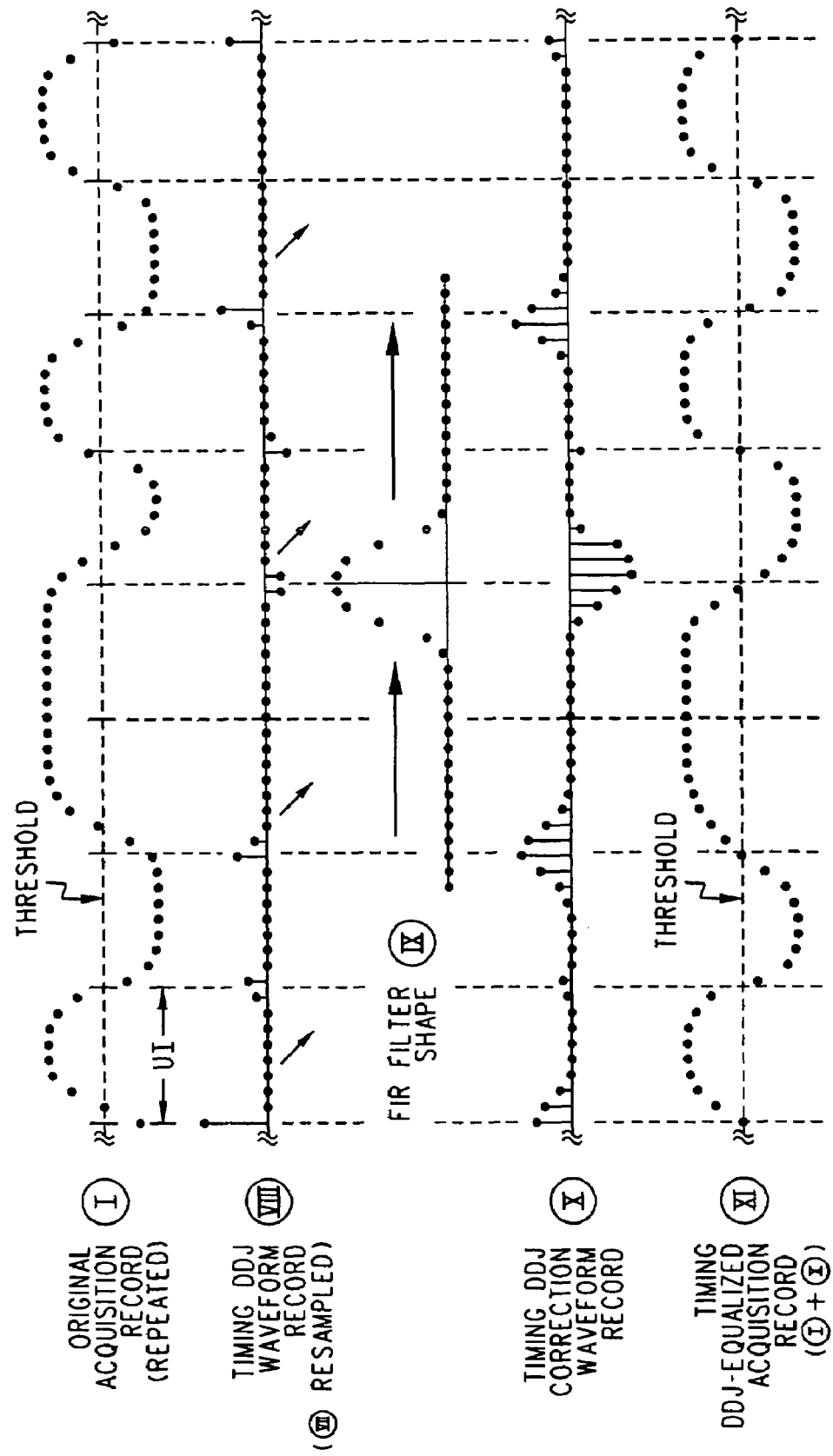
FIG. 8C TIMING DDJ EQUALIZATION USING A COMPENSATORY VOLTAGE WAVEFORM

A VOLTAGE DDJ EQUALIZATION PARADIGM

VOLTAGE DDJ EQUALIZATION USING A COMPENSATORY VOLTAGE WAVEFORM

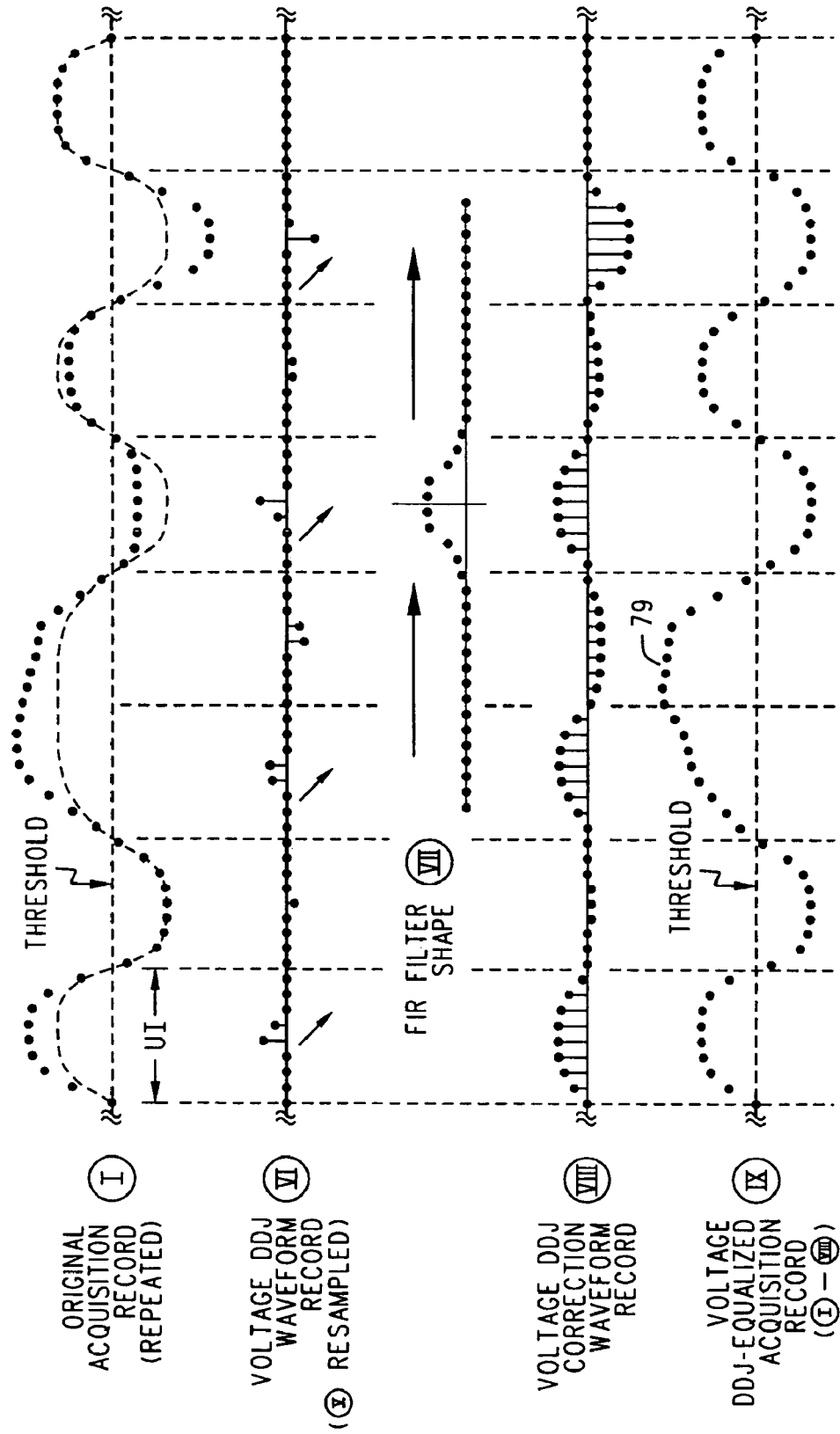

METHOD FOR EQUALIZING A DIGITAL SIGNAL THROUGH REMOVAL OF DATA DEPENDENT JITTER

REFERENCE TO RELATED PATENTS

The subject matter of this patent application is related to that of U.S. patent application Ser. No. 10/978,103, now United States Patent Application Publication US 2006/0093027 A1, entitled METHOD OF FINDING DATA DEPENDENT TIMING AND VOLTAGE JITTER IN AN ARBITRARY DIGITAL SIGNAL IN ACCORDANCE WITH SELECTED SURROUNDING BITS filed 29 Oct. 2004 by Steven D. Draving and Allen Montijo and assigned to Agilent Technologies, Inc.

That patent application describes a method of discovering values of DDJ that can plausibly be ascribed to the various bits in an arbitrary digital signal. The instant application deals with a new method of using such information once it has been found. For the sake of brevity METHOD OF FINDING DATA DEPENDENT TIMING AND VOLTAGE JITTER IN AN ARBITRARY DIGITAL SIGNAL IN ACCORDANCE WITH SELECTED SURROUNDING BITS is hereby incorporated herein by reference. METHOD OF FINDING DATA DEPENDENT . . . JITTER . . . itself incorporates several other US patent Documents, but is nevertheless sufficiently self-contained with respect to what we need it for here (evidence that individual values of DDJ can be found for each bit in an arbitrary digital signal, and generally how that is done and the form taken by the result), that it is believed unnecessary to also incorporate herein those several other US patent Documents.

BACKGROUND OF THE INVENTION

High speed digital systems, whether for computational or communications purposes, rely on the ability to correctly ascertain the logical value of a binary data signal at specific times. In a digital system there are abrupt transitions between the logical values, and the nominal period of time that the data signal can represent a particular logical value is called the UI (for Unit Interval). Generally, there is provided (or derived) another signal, called a clock signal, whose period is also the UI and whose abrupt transitions in a selected direction serve as the above-mentioned 'specific times' at which the logical value of the data signal is to be ascertained, a process which is often termed 'sampling.'

In an ideal world, all edges in the data signal would occur at locations along a time axis that were an exact UI apart, or at exact multiples of the unit interval. The 'rattle' that actually occurs in the edge position of a signal that is supposed to transition only at particular times is timing jitter, and when it is understood that it refers to edges, it is often called simply 'jitter.' But the notion of jitter as a succession of incorrect minor errors includes more than timing phenomena; the voltage levels that are asserted to represent the logical values are generally not ideal, either. That is, their voltage levels may vary in time while asserted (and here we are neglecting proper excursions for rise and fall), or exhibit slow drift over time or with temperature. The more rapid variations within a UI (or among a collection of UI occurring at about the same time) while asserted are often thought of as voltage noise, and are also properly thought of as a form of jitter. We are in this Application more interested in the rapid noise behavior than in slow drift, and are prepared to consider such noise as voltage jitter that is also included within the scope of the term 'jitter.' Voltage jitter as a form of jitter is perhaps less familiar than the notion of noise (real signal equals ideal signal plus noise of some bandwidth), but is still a useful concept, since it lets us characterize voltage behavior using the jitter analysis tools developed for timing jitter. Voltage jitter can have just as deleterious an effect on ascertaining logical values as timing jitter does, as it lowers margins for logical value determination and, when it affects an edge of finite slope, moves the location of a threshold crossing (should one be in use). Much of what we will say applies to both timing and voltage jitter, and should be understood as such when we use the term 'jitter' either in isolation or without a qualifying context. We shall endeavor to indicate which of timing or voltage jitter we have in mind when the topic at hand does not apply to both.

One further clarification is in order. While we recognize that both timing and voltage jitter can affect a system, and that each can be measured, characterized and analyzed through the use of similar techniques and paradigms, we shall treat them as separate phenomena, in that they have separate causes, but which can sometimes produce overlapping results (as when voltage noise moves the location of a threshold crossing). In this view, jitter is only known through measurement, and how it is measured greatly affects the result that is obtained. We remain mindful that when a complex thing is measured two different ways, we must not be surprised if the answers are not identical.

In today's high performance digital systems, the presence of jitter in the data signal or in the clock has a significant effect on the system's ability to correctly ascertain the logical values of the data signal. To reduce jitter one generally has to locate its source, a clue to which is the type of jitter it produces. It turns out that it is useful to recognize that each of overall timing jitter and overall voltage jitter is composed of several different types of (component) jitter. Test equipment intended for use with high performance digital systems often include in their repertoire of operations automated measurements of several types of jitter. Total Jitter (TJ) is the aggregate amount of observable jitter, and is (or ought to be) the 'sum' of all the various types of component jitter. Types of component jitter include Periodic Jitter (PJ), Random Jitter (RJ) and Data Dependent Jitter (DDJ). DDJ is jitter that is correlated with the content of the data itself. It is generally not possible to readily directly measure only a particular type of component jitter, since we can't observe those types in isolation: the measured data will generally include the combined effects of various types of jitter. Indirect methods are needed to separate from a combined result the data for an individual type of jitter (e.g., using a suitable models or other analysis technique).

That said, one thing we won't attempt is the wholesale decomposition of one kind of timing jitter into some equivalent form of voltage jitter, or vice versa. (It might work sometimes, but not always.) Like different genders, sometimes what they do overlaps, and they have things in common. Yet it appears that the most practical approach is to say that timing jitter is one way of measuring something, and that voltage jitter is another way, and that while both are measurements of jitter, the ultimate causes of that jitter are varied. Some are specific to voltages and others to timing, while some might be thought of as causing both. So, when we offer an analysis of, say, a particular measured (timing) component jitter for TJ (for timing), it will be appreciated that, unless otherwise stated, there is a corresponding (voltage) measured component jitter for voltage TJ, but that the two TJs and their respective components are treated as though they were quite distinct from one another.

(Upon reflection, one might wonder if the two measured types of TJ combine to indicate more jitter than is 'actually' there. That does seem to be a possibility, since one or more causes may be contributing twice. However, we are NOT tempted to combine the two measurements, nor do we have a way to measure any supposed 'real' Total Jitter. To be sure, we can get a voltage waveform that has been sampled as densely as you'd like and that ought to be an operationally complete description of 'real' Total Jitter—but then what? What is the rule for putting this behavior into this bin and that behavior into another. And if no such separation is attempted, then what is the unit of measure by which the jitter is to be described in the first place? (Evidently the unit is not simply one of time or voltage . . . ) Well, one might imagine the integral of the difference between an ideal waveform and the real one, divided by time. It is a unified measure and essentially it is an area. So, say we give you one hundred square feet of some stuff, the value or usefulness of which may well be different if it is a sheet ten feet by ten feet, as opposed to one foot by a hundred feet. The dimensions of the area influence your opinion of the circumstances. So it is with waveforms; both voltage and time are independently important, even though they might be combined into an 'area' that is the product of two dimensions. It seems we are stuck with measuring the jitter of each of the time and voltage dimensions, even though those dimensions don't always have independent causes for their jitter.)

We are particularly interested here in a DDJ measurement technique for both timing and voltage jitter that is useable in a real time Digital Sampling Oscilloscope (DSO) or comparable environment. It begins with the production of a suitably long digital Test Pattern which may contain a random sequence of bit values, or, which might be actual live data. An Acquisition Record is made of the entire Test Pattern. (That is to say, the digital data may be sampled using the techniques found in modem high speed real time DSOs, in which case a representation (a sequence of numbers in a file) of the actual analog waveform of the sampled digital signal is reconstructed with Digital Signal Processing (DSP) techniques, and the sequence of logical values found from inspection of that reconstruction. What follows for the next several paragraphs is a highly abbreviated version of the Summary of the incorporated METHOD OF FINDING DATA DEPENDENT TIMING AND VOLTAGE JITTER IN AN ARBITRARY DIGITAL SIGNAL IN ACCORDANCE WITH SELECTED SURROUNDING BITS. Our immediate aim in the next several paragraphs is to support the notion that we can get both a UI by UI (for voltage) and edge-by-edge (for timing) description of DDJ.

For timing jitter measurements, an original Time Interval Error (TIE) Record is made from an inspection of the locations of the edges in the Acquisition Record. (A TIE Record is a data structure that associates, for each edge in the Acquisition Record, the error in time by which that edge actually transitioned, as opposed to when it should have.) This may be accomplished with the help of an associated clock signal that either accompanies the data signal of interest or that is derived therefrom.

For a voltage jitter measurement, an original Voltage Level Error (VLE) Record is made from an inspection of the behavior of the signal at locations within the exerted but non-transition portions of each UI. A VLE Record is similar to a TIE Record, except that it is, for each UI, an aggregate measure of how the asserted voltage varies from the ideal case. Upon reflection, it will be appreciated that such a measure is, of necessity, somewhat stylized, in that one might obtain such a measure in any of several different ways, and that each will likely produce a somewhat different result. (For example: How much of the interior of the UI is inspected? Are RMS values used or just peak-to-peak excursions? And so on.) The answer is that all these different approaches are valid, and it is principally a question of cost versus benefit influenced by preference combined with available resources. Upon further reflection, it will be realized that a similar can of worms is associated with the seemingly simpler task of finding Time Interval Error values from when in time the signal actually crossed a threshold. (For example, DSP can convert sampled values to a dense time domain collection of sequential voltage values, but where is the threshold supposedly set? Is it an absolute value? Is it some sort of weighted average? Or is it a simple average of peak logic level excursions? And is straight-line interpolation sufficient to find the actual threshold crossing when—as usually occurs—the values provided by the DSP fall on either side of the threshold, or is a curve fit appropriate?) Once again, the answer is that all these different approaches are valid, and it is principally a question of cost, benefit and preference combined with available resources.

Fortunately, all these considerations about how to find a TIE or VLE value are applicable as post-data-acquisition processing activities, so that if it takes a few seconds to apply the selected techniques to the Acquisition Record, that won't be a burden. (That is, as long as we don't have to do it in real time at a rate fast enough to keep up with the data . . . .) And, if we have confidence in the DDJ measurements that result (and we haven't described yet how those are accomplished), then we really need to do that original TIE/VLE Record production only once for a suitable Test Pattern, as subsequent 'live' data can be processed for DDJ much more quickly if the following assumption is true: Suppose we found the TIE/VLE Records for that subsequent 'live' data—they won't be significantly different than the ones we already found for the Test Pattern, so we can continue to use an existing earlier found understanding of DDJ for the particular SUT of interest.

To continue with DDJ measurements, a user defines a Template that is a collection of associated bit behaviors at bit locations that are nearby or otherwise related to a (reference) bit location of interest. The locations within the collection need not be contiguous or adjacent. A Template can be defined as either bit values, as transitions (edges), or as a mixture of both. A Template might be the two bit-values (or transitions) before and the two bit-values (or transitions) after the bit value (or transition) of interest. The nature of the expected source of jitter may influence the nature of the Template. For example, an electrical structure involving a transmission line that is causing reflections might prompt the use of a Template having two or more groups of one or several bits in each group, where the groups are separated by a number of bit positions.

A Template has associated therewith a collection of Descriptors and their respective Metrics. Each Descriptor identifies an instance of the various different patterns of bit values (or transitions) that, if they were to occur, would fit the Template. For example, the 'two before/at/two after' bit-value Template can have (at most) thirty-two different ways that it can occur ('two before' plus 'two after' plus the one of interest that is 'at' is five two-valued bits, for $2^5$=32 different patterns, although the need for an 'at' edge to occur will cut the number of possible Descriptors in half). The DSP reconstruction (Acquisition Record) of the actual waveform of the Test Pattern is examined (in conjunction with the original TIE Record and/or perhaps the original VLE Record) for the presence of Descriptors. The signed amount of TIE/VLE for the bit position of interest (in the Template) that locates the position of any Descriptor anywhere along the waveform is measured from the original TIE/VLE Record, for each occurring instance of each Descriptor in the Template. The collection of measured TIE/VLE values for each particular Descriptor are averaged (or otherwise combined) to produce a DDJ Metric for that Descriptor. A Look-Up Table (LUT) addressed by the different possible Descriptors is loaded with the discovered DDJ Metric that is associated with each Descriptor.

Such a LUT can be used to separate TJ into one portion that is DDJ and into another portion that is PJ convolved with RJ. The separation works because: (1) TJ is assumed to be the 'sum' of those two portions and no others; and (2) DDJ is correlated with the Descriptors, while PJ and RJ (and thus also their convolution) can be expected to average to nearly zero ('self-cancellation') over a sufficient number of instances of a given Descriptor; i.e., if the Test Pattern is long compared to the size of the Template. Once that LUT is created a plausible value of DDJ can be imputed to each UI (voltage jitter)/edge (timing jitter) in the test pattern by using the Descriptor associated with that UI/edge as an index to address the LUT and obtain the DDJ Metric stored therein.

Now, supposing that we have in hand such a precise description of DDJ occurring in a System Under Test (SUT), there are various ways that it might be put to good use. As an example, the identified instances of DDJ can then be individually removed from the corresponding locations of the Original TIE Record for the measured TJ to produce an Adjusted TIE Record whose only remaining jitter is PJ convolved with RJ. Down that path lies a further analysis of those types of jitter. Another example is the discovery of a filter for regular use on actual data to remove or lessen the effects of that DDJ. The data resulting from such filtering is often referred to as having been 'equalized' and the filtering process itself called 'equalization.' It is a form of error reduction, and it is to the support of such equalization that this Application is principally directed.

Certainly, if one were to include such an equalization mechanism in a data communications path he would like to be able to test it under varying conditions, or, use an obtained description of the DDJ it is suppose to fix as a way to arrive at a corresponding definition of the filter. We have just seen that a description of DDJ can be found, and we will assume that given that description competent engineering efforts can arrive at a proposal for an equalization filter. But how well will it work? And what will be the effects of including other types of jitter in the data? Such questions are often answered with a fairly good degree of certainty before any proposed design is committed to silicon, as it were, by sophisticated modeling techniques performed using computers. That is, there are computer programs that use as data a suitably dense time domain description of an input waveform (akin to our Acquisition Record) and apply that to an emulation of the proposed system (a 'virtual SUT,' as it were) to see what happens. A virtual SUT may very well include a proposed equalization scheme in need of characterization. To test the virtual SUT we need to send it particular kinds of data, in order to judge its performance.

For example, one might half-split the virtual SUT into a first portion that is the equalization filter and a second portion that is whatever follows. Equalized data (with and without non-DDJ jitter) could then be sent to the second portion to characterize its behavior. And, even before deciding upon an equalization scheme, it would be nice to have good confidence that removal of the associated DDJ will produce a satisfactory result that is worth the effort. In support of that last idea, a sequential record of values representing a non-equalized waveform for the data, including jitter, can be applied to a mechanism that produces an eye diagram. Say, for example, the aforementioned Original Acquisition Record is used for that purpose. Then a similar Equalized Acquisition Record is applied, and any improvement in the eye diagram is noted and considered. If the eye diagram is already pretty good and does not get much better, then we are invited to decide if equalization is worth the trouble, or, if the eye diagram is marginal and stays that way, perhaps our present description of DDJ for the SUT is inadequate. That is, if there is not sufficient improvement for a ratty looking eye diagram, maybe we should try a more complex Template for DDJ, and do so BEFORE we commit resources to developing an equalization filter based on the discovered DDJ associated with that (suspect) Template. A third case is that a marginal eye diagram gets significantly better when DDJ is removed. Then we know that it is indeed worth the trouble to perform equalization, and also know what equalization to perform. We can also use such experimentation to ensure that we do not inadvertently use a Template that is more complex than needed, by trying increasingly more complex Templates and noting at what point an 'improved' understanding of DDJ fails to provide increased eye openings (i.e., this more complex equalization is not significantly better than this simpler one).

Now, how such models for virtual SUTs and eye diagram analyzers driven from data in a file actually work internally is not our present interest; that they do work is a matter of record supported by their presence in commerce. But how to convert our Original Acquisition Record into appropriate Equalized Acquisition Records for use as input for testing by such mechanisms is a set of interesting problems. Equalization of timing jitter or equalization of voltage jitter can each be performed as a sole type of equalization, and a technique is needed for each. An eye diagram evaluation could reveal that one or the other equalization has a pronounced effect, or has almost no effect. But as will become clear in due course, when both are used together, they interact. We can assess the consequences of such interaction if we create an Equalized Acquisition Record that mimics the interaction and then evaluate the result with an eye diagram. This could help us decide that we want a combined equalization scheme that uses more of one type and less of the other. How to model that interaction is yet another interesting problem.

So, we have issues concerning DDJ Template verification, DDJ equalization benefit verification, and concerning interaction between voltage and timing types of equalization for DDJ. All in all, quite a nice little nest of snakes. It would appear that suitable Equalized Acquisition Records would, if we but had them, give us a useful snake abatement tool. Currently, we have no such Equalized Acquisition Records, and after some thought we realize that any attempt to make them runs certain risks. A 'meat cleaver' cut and paste approach to moving edges for timing jitter reduction, for instance, may introduce apparent (and spurious) voltage discontinuities in the equalized waveform. We seek a genuine reduction in the magnitude of the snake situation, and not merely an exchange of one snake for another. Apparently, some sophistication is required in the creation of such Equalized Acquisition Records. What to do?

SUMMARY OF THE INVENTION

An Equalized Acquisition Record is prepared from an Original Acquisition Record reflecting the presence of Total Jitter and a body of information that relates amounts of Data Dependent Jitter to the occurrence of those data in the Original Acquisition Record. The Original Acquisition Record is a data structure containing sequential voltage values versus time for an arbitrary Test Pattern. An Equalized Acquisition Record is a similar data structure, except that the time variant voltage waveform that it represents has been adjusted to remove Data Dependent Jitter. For removal of timing jitter that involves altering the location of the edge associated with the data event that specifies the amount of jitter. The edge is moved in a compensatory direction by the specified amount. In general, however, the edge cannot simply be shifted over an arbitrary amount in time without causing discontinuities at the locations where it joins the rest of the waveform. In the case of correction of voltage jitter the asserted central portion of a Unit Interval is adjusted in voltage, and a similar issue arises concerning connecting the adjusted portion to the pre-existing transitions.

A first technique can be used to reposition edges for equalizing DDJ timing jitter. This first technique involves using filtered time shifted interpolation along the existing Original Acquisition Record to discover plausible new voltage (Y) values to assign to the Acquisition Record's existing locations along the time (X) axis. DDJ is an input to this process and the amount of change in a voltage value is automatically influenced by the slope of the edge being moved, such that the amounts of correction nearer the beginning and end of the edge (where its slope is least) are progressively diminished. That diminution will not occur for asserted regions whose dv/dt does not approach zero. An additional filtering of the DDJ input diminishes its value at locations further from the correct zero crossing, forcing the equalized result to converge to whatever waveform is represented by the Original Acquisition Record. Together, these act to greatly attenuate any discontinuity in the equalized waveform.

A second technique of adding a compensatory voltage waveform to that represented by the Original Acquisition Record can be used to equalized either timing jitter or voltage jitter. This second technique construes the desired amount of correction for each data event as an impulse that is applied to a Finite Impulse Response Filter. The Filter's output is a Voltage Correction Waveform having a smoothed voltage excursion with skirts that return to the baseline within about one Unit Interval. The time variant voltage values output from the Finite Impulse Response Filter are collected into a Voltage Correction Waveform Record, which is a data structure similar to the Original Acquisition Record. It is arranged that these two Records have entries that are for common points in time. A point-in-time by point-in-time addition of these two Records produces the desired Equalized Acquisition Record. The principal differences between equalizing for time and equalizing for voltage with this technique are first, different criteria are used to identify the error to be removed (this difference shows up in the manner in which the Data Dependent Jitter was discovered), and second, the Finite Impulse Response Filters are used to convert from a time input to a voltage output in the timing jitter case, and from voltage to voltage in the voltage jitter case.

Lastly, the method does not depend upon any particular way of representing the correspondence between data events and their values of jitter. The representation could be embodied in a Look-Up Table or in a computational rule that has been discovered for the particular System Under Test.

BRIEF DESCRIPTION OF THE DRAWINGS

FIGS. 7A-B are a simplified collection of waveform diagrams illustrating the filtered time shifted interpolation method of producing in a Digital Sampling Oscillographic environment an Equalized (for timing jitter) Acquisition Record;

FIGS. 8A-C are a simplified collection of waveform diagrams illustrating the compensatory voltage waveform method of producing in a Digital Sampling Oscillographic environment an Equalized (for DDJ timing jitter) Acquisition Record;

FIGS. 10A-B are a simplified collection of waveform diagrams illustrating the compensatory voltage waveform method of producing in a Digital Sampling Oscillographic environment an Equalized (for DDJ voltage jitter) Acquisition Record.

DESCRIPTION OF A PREFERRED EMBODIMENT

Figure 1:
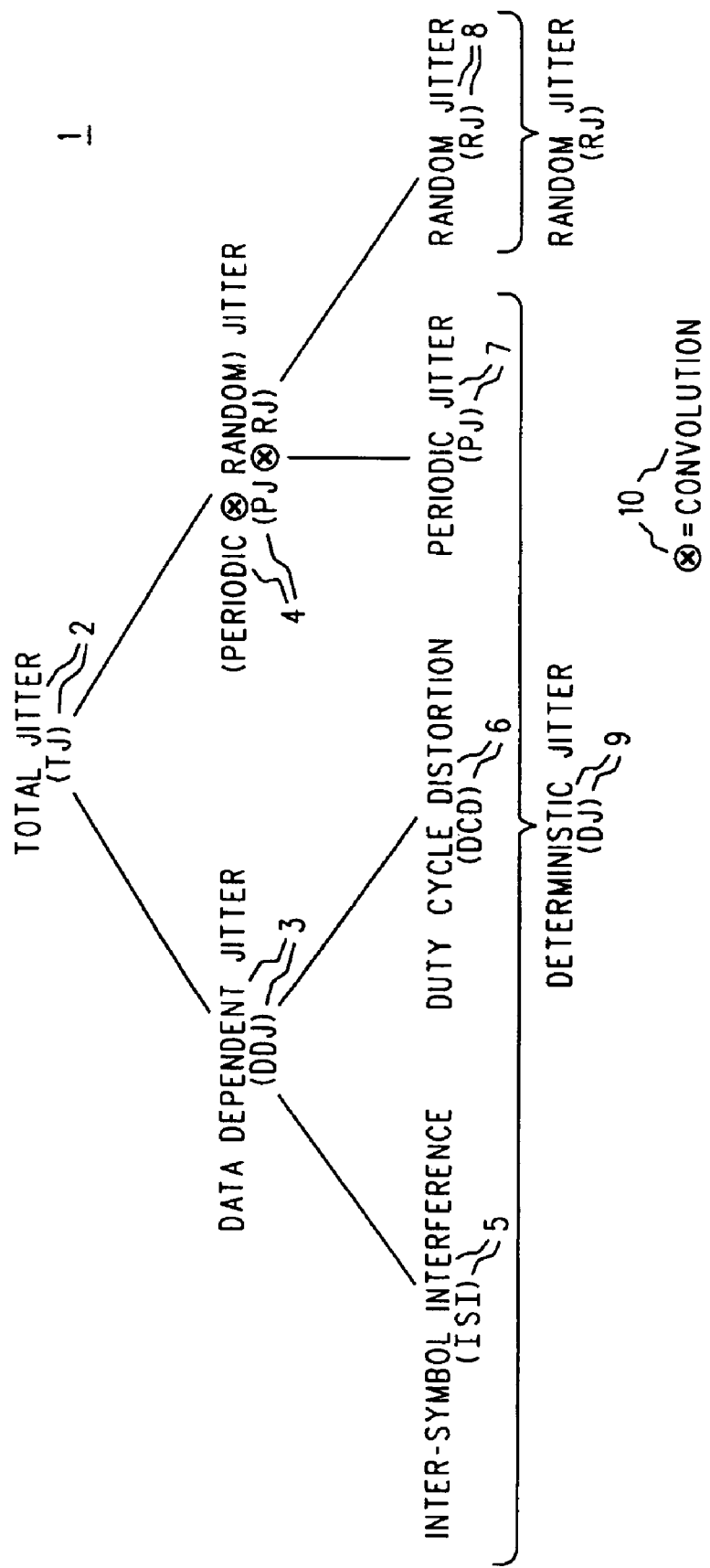
FIG. 1 is a prior art diagram illustrating a preferred manner of decomposing Total Jitter into Data Dependent Jitter and Periodic Jitter convolved with Random Jitter.

Refer now to FIG. 1, wherein are shown some relationships between the various types of jitter with which we shall be concerned. FIG. 1 is a diagram 1 describing a paradigm useful in understanding jitter. It begins at the top with the notion that there is something called TJ (Total Jitter) 2. It represents all the aggregate jitter that is present in the system being measured. It will be recalled that wherever we use the term 'jitter' it applies to either timing jitter or voltage jitter (noise), unless there is, either specifically or through the context, an indication that only one or the other is meant.

In the paradigm of FIG. 1, TJ 2 is composed exactly of two component parts, one of which we call DDJ 3 (Data Dependent Jitter) and the other of which is the combination (4) of PJ⊗RJ. This combination 4 is of Periodic Jitter (PJ) 7 convolved with Random Jitter (RJ) 8. Both representations describe probability density functions, and the proper method of combining, or summing, two probability density functions such as 7 and 8 is convolution, which operation is indicated by the symbol ⊗ (10).

RJ 8 is assumed to arise for inescapable natural reasons, after the fashion of thermal noise or quantum effects, and is further assumed to be Gaussian in nature. PJ 7 is jitter that has a strong periodic content, say, for example, that a strong periodic signal from another system is coupled via cross talk into the system being measured. It might have no correlation whatsoever to the SUT (System Under Test), but is nevertheless regular. And while the presence of PJ in our paradigm allows for this sort of thing, in some SUTs there might not be any detectable PJ.

The other component of TJ 2 is DDJ 3. This is jitter that is caused by, or is correlated with, the particular patterns of bits in the data being transmitted. It turns out that there are mechanisms that allow data which has already been sent, or data which will be sent, to affect the reception of the bit currently being received. (The notion 'has already been sent' seems benign enough; perhaps local heating or cooling related to certain activity in the data disturbs thresholds or alters rise or fall times. But 'which will be sent' might seem as if it requires an effect to precede its cause. Not to worry. The idea is that a complex transmitting mechanism, such as a SERDES, say, has a highly pipelined parallel architecture with busses interconnecting FIFOs and registers all susceptible to cross talk, and that the complex transmitting mechanism DOES ALREADY CONTAIN the evil data that is the 'cause.' That data just hasn't been sent yet over the transmission path to the receiver, and the jitter will get into the data as it is sent. Thus, causation still precedes its effect, and no mysterious metaphysics is required.) Since these phenomena are already reported in the literature, we needn't dwell on them further. One measure of such DDJ is ISI 5 (Inter-Symbol Interference) and another is DCD 6 (Duty Cycle Distortion).

Finally, we group ISI, DCD and PJ together as DJ 9 (Deterministic Jitter). It will be appreciated that while the DDJ portion of DJ is separable into ISI and DCD, those components are not necessarily independent nor mutually exclusive, and they generally do not combine by convolution. In any event, the intent of this grouping is that DJ 9 is all jitter that is not truly random in nature (RJ, 8), but that is either somehow correlated with the data, or is downright periodic, which in neither case fits our intuitive notion of 'random.'

In this Application we are interested in a certain use for DDJ, and will assume that it has been measured for the particular SUT of interest. That is, our starting point is that some Template has been chosen and a suitably long arbitrary Test Pattern has been measured and analyzed to produce a correspondence between data events (the aforementioned Descriptors that can occur within the defined Template) and amounts of DDJ. That correspondence can be instantiated either as a Look-Up Table or as a computational rule. How this is accomplished is the subject matter of the incorporated METHOD OF FINDING DATA DEPENDENT . . . JITTER . . . , of which a very abbreviated summary was included in the preceding Background.

Figure 2:
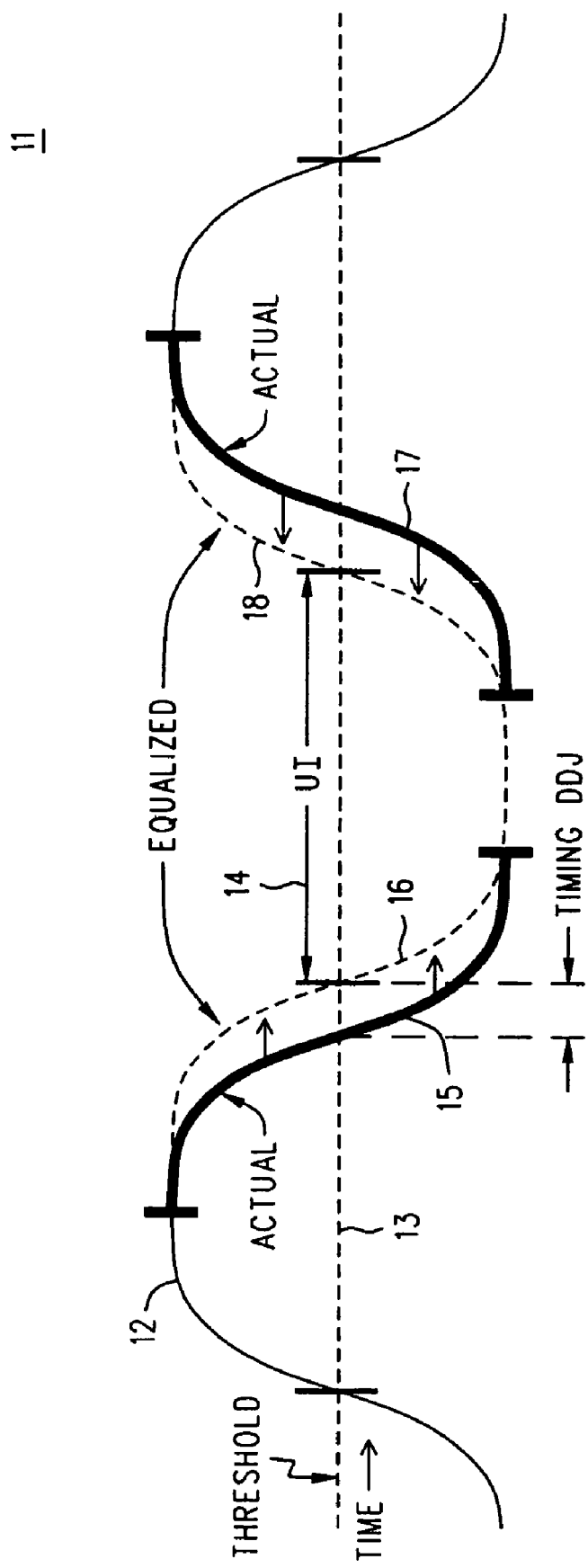
FIG. 2 is a waveform diagram illustrating the basic idea of DDJ timing jitter equalization.

Turning now to the issue of equalizing timing jitter caused by DDJ, the waveform illustration 11 of FIG. 2 depicts three bit-cycles of a signal 12 whose crossings of a threshold 13 ought to be a Unit Interval 14 apart. While other forms of jitter might be present, let us assume for simplicity that only timing DDJ is present, and that its values are known. That is, we can say that dotted transition or edge 16 is what should have occurred for the left-most complete bit, while the heavy line segment 15 indicates what actually did occur. Similarly, dotted line 18 is the ideal replacement for the actual heavy edge 17. If a waveform equalized for timing DDJ were to be created for signal 12, then what we seek is a way to alter the data describing the heavy lines to describe instead the dotted lines. It will be noted that the heavy solid lines extend from about the middle of one UI to the middle of the subsequent UI. The implication here is (for the present, anyway) that we want whatever we do to fix one instance of timing DDJ occurring within a time frame to not materially overlap what might be done to fix an adjacent instance of timing DDJ. That is, we want our corrections for the timing DDJ at each transition to be independent of each other. For equalization of timing jitter, and in a setting where the data rate was low and timing DDJ was always a small percentage of the UI, then the solid heavy lines might appear much shorter, and cover only the transitions themselves. For correction of voltage DDJ, the heavy black lines might better run between consecutive threshold crossings. (We shall have more to say about that issue, later.)

We shall say that edge 15 is retarded to become edge 16, while edge 17 is advanced to become edge 18. In this connection we need to point out the convention that will be used in the waveform diagrams that are used in this and the explanations that follow. It is the usual convention where waveform diagrams are shown as (stationary) graphs of voltage versus time. That is, the abscissa is a Time Axis, and things that happen later in time have larger Time values that are found toward the right along the Time Axis. This follows the conventional oscillographic interpretation of waveforms. (There is another convention, less frequently used, that is essentially a snapshot taken relative to a point of interest for a moving waveform, such as might be carried by a transmission line. The difference is that, say, when moving to the right along the depicted moving waveform it represents something that has already happened, or is earlier, instead of later, in time. Also, the abscissa might be distance instead of time. We won't be using that alternate convention.)

Figure 3:
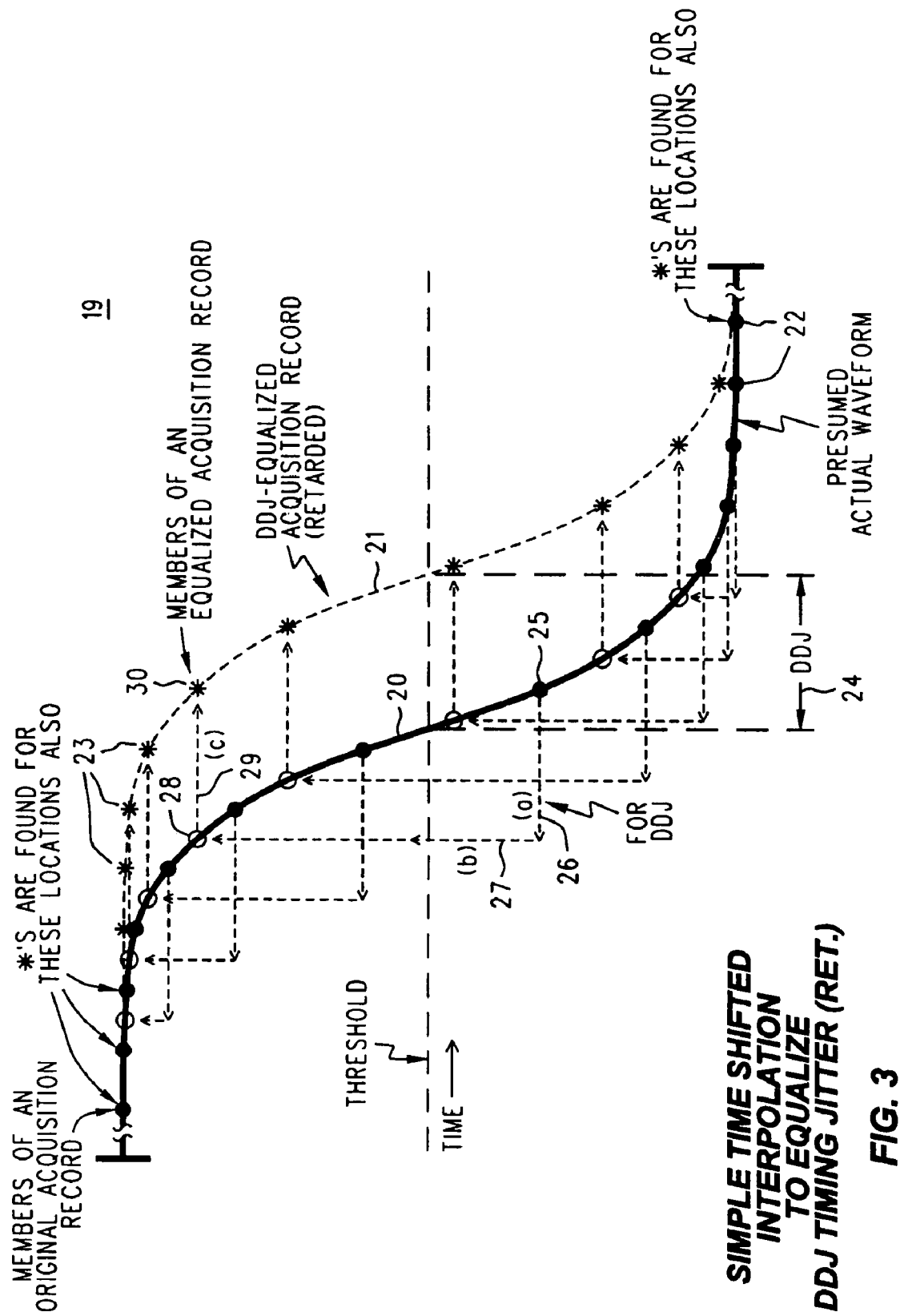
FIG. 3 is a waveform diagram illustrating simple time shifted interpolation to equalize (by retarding a transition) DDJ timing jitter.
Figure 4:
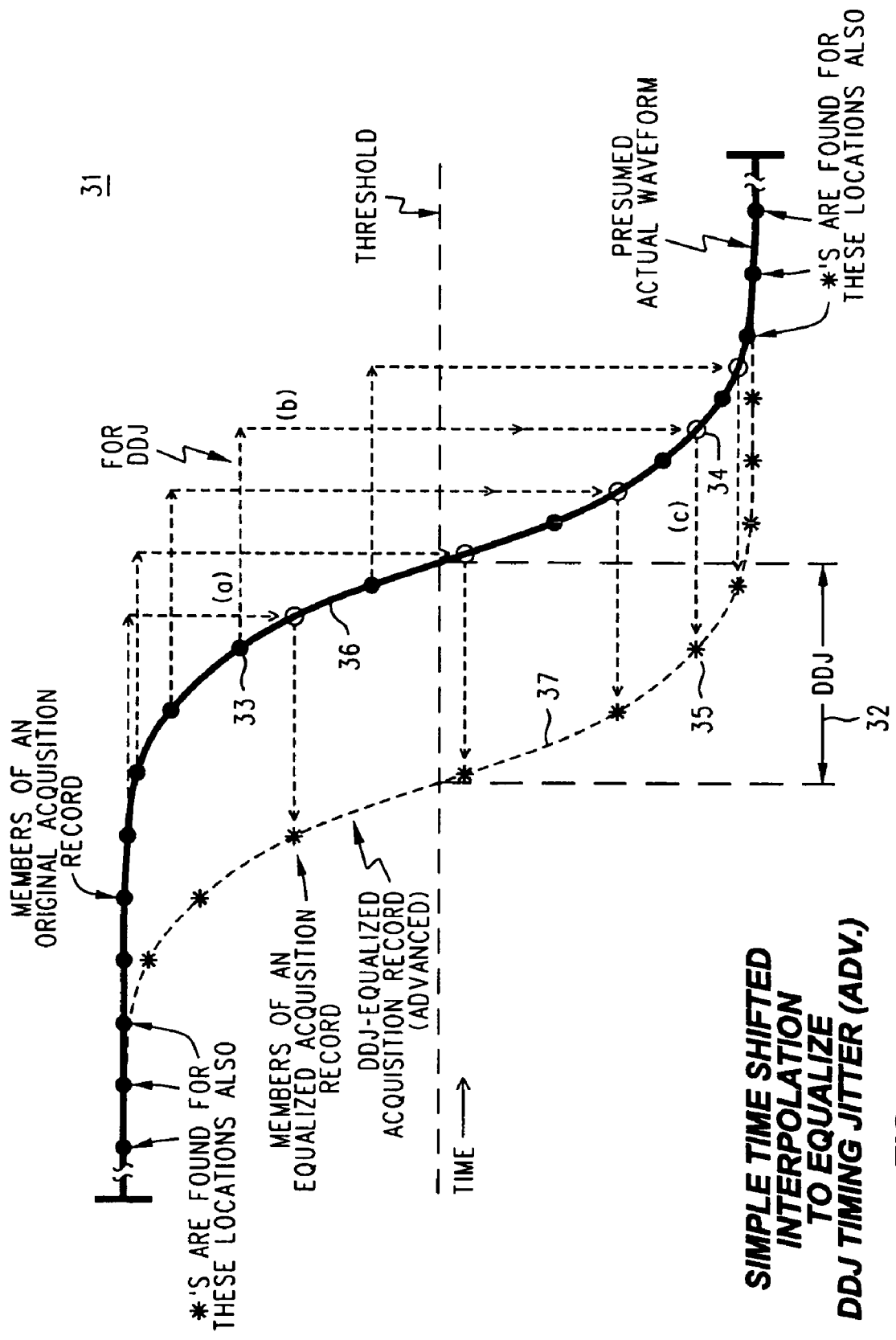
FIG. 4 is a waveform diagram illustrating simple time shifted interpolation to equalize (by advancing a transition) DDJ timing jitter.

Considering now just timing DDJ, FIG. 3 is an illustration 19 that shows a technique that we might use for retarding a transition (such as 15 to 16 in FIG. 2), while FIG. 4 is an illustration 31 that shows the same technique for advancing a transition. In the illustration 19 of FIG. 3, the solid heavy line 20 corresponds to 15 in FIG. 2, while the dotted line 21 of FIG. 3 corresponds to 16 in FIG. 2.

The waveform to be equalized is depicted as a continuous solid line, as is customary for time variant waveforms, even though we do not posses a true continuous representation of the waveform. Along the solid heavy line 20 are consecutive solid dots 22. These dots represent voltages that the actual analog voltage waveform would have at the corresponding discrete points in time, and as for the spacing of the dots, it is simply arranged that they are spaced 'closely enough' for whatever purpose is at hand. In that regard, these dots (22) originate as the voltage samples taken by the DSO, and if that process produces a spacing that is 'close enough' then all of the dots in the figure represent actual samples, and we would say that they belong to an (Actual, or Real) Acquisition Record (a data structure of sequential values). On the other hand, sometimes the DSO might not sample quickly enough, and between pairs of 'real dots' one or more 'synthetic dots' are found by DSP/interpolation techniques to produce what might be called an Augmented Acquisition Record. All this is conventional stock in trade for the DSO community, and we mention it mainly to point out that we don't care which history accounts for the Acquisition Record, whether Actual or Augmented. (We shall henceforth call either one simply an Original Acquisition Record, to both avoid the awkward use of 'Actual/Augmented' and to distinguish such Records from other similar acquisition-style records having the same basic format, but whose content is different and intended for another purpose.) Whichever way it was that our Original Acquisition Record got to be a dense enough description is not of concern. We will assume that the resulting dots (entries in the record) are regularly spaced, and that we know what that spacing is. It will now be appreciated that the solid heavy line 20 (and the dotted line 21) are shown only to remind us of the actual continuous analog behavior that is (sufficiently) approximated by the sequence of solid dots 22 (or the asterisks 23).

So, without further ado, how is it that we might turn the solid line 20 into the dotted line 21, knowing that a particular value of timing DDJ (24) is associated with this particular transition? Over the range of interest for this particular transition, as represented by the solid black line 20, we do the following for each solid dot (here represented by 25): First, we find a location represented by asterisk 30 by asking the question "What would the voltage at the time of dot 25 likely be if there were no DDJ?" This is done by going back in time by the DDJ value for this transition (i.e., by the amount 'a' in the figure), and then finding (via 'b' intersecting the solid line 20) the voltage value of the solid line 20 at that time. That location is indicated by an open circle 28. Second, we take that voltage (at 28) and use it at the time for solid dot 25, by shifting back forward to the original time (via 'c') to become the location indicated by the asterisk 30. For later convenience, let us call this mapping of a solid dot into an asterisk either: (1) a 'three-sided-box transformation' of a dot into an asterisk (where 'a', 'b' and 'c' are the three sides of the box, and 'a'='c'=DDJ for the particular transition being equalized); or (2) "time shifted interpolation." When applied to all of the dots within the solid heavy line, the result is a sequence of asterisks that can be used to described the equalized transition.

FIG. 4 shows a corresponding equalization example (31) where the solid heavy line is advanced (instead of retarded) to become the dotted line. Here the value of DDJ (32) is different, but solid dot 33 becomes asterisk 35, via the three-sided-box transform using (a) and (b) to find open circle 34 and ©) to set asterisk 35 back into vertical alignment with the original solid dot 33. Thus, the original transition represented by heavy solid line 36 becomes the advanced equalized transition represented by the dotted line 37.

In the examples of FIGS. 3 and 4 the edge to be adjusted is a falling one. Upon consideration, it will be appreciated that in each case the situation is not altered if it were replaced by a rising edge in the same location. Advancing would still be advancing, and retarding would still be retarding. All that would change is the direction along leg 'b' of the three-sided-box that is traveled to perform the interpolation. That difference, however, is subsumed by the (known) process of interpolation, and is of no particular interest to us.

Of course, in either example, we never really have either the heavy solid line or the dotted line as an actual (continuous) item on hand. All we ever have is the sequence of solid dots and their corresponding asterisks, which are kept in suitable data structures ('Acquisition-style' Records). This brings us to comment on the following observation: "Very well, but why go to all the trouble of interpolating to find the open circles. Why not simply create the asterisks by changing the time of the associated solid dots by DDJ?" Our comment on that observation is this: It is true that this would produce a dotted line that was just as equalized (albeit a different description of the same dotted line), but it probably would not be as useful. The reason is that it would not be in the format expected by the mechanism that was going to use it. That format is that of an Acquisition Record, and it has equal spacing in time for its entries. The introduction of a shift by DDJ for part of the record would violate that property, and would cause the using mechanism to operate incorrectly. The using mechanism could interpolate (re-sample) to regain the equal spacing in time, but that is equivalent to the time shifted interpolation we have just described.

There is yet another useful observation we should make. It goes to yet another objection that notices that the technique described will, in general and because of the shift, create a gap (between solid dots and asterisks) in the record at one end of the transformation and a region of overlap at the other. (To see this, it might help to suppose that DDJ is large in comparison to the spacing between the solid dots, although that condition is not required.) In the rather contrived examples of FIGS. 3 and 4 the (non-transitional) asserted regions are quite flat, with the consequence that at each end of the transition the values of 'b' get smaller as the active (transition) regions are entered, and asterisks eventually become indistinguishable from the solid dots as 'b' approaches zero. So, to fix a gap a few extra solid dots can be used to fill it and no one will be the wiser. Likewise, where there is overlap, again because of the indistinguishability, some asterisks can be discarded without harm, where there is already a solid dot in that location (or vice versa).

However, it is the case that the examples of FIGS. 3 and 4 are indeed rather contrived, so that the easy replies to the objections of the overlaps and gaps (and some other objections in FIG. 5 not yet raised) are too glib. Basically, the time shifted interpolation technique is a good one, but it needs some extra help. The material of FIGS. 2-4 is a good starting place, and helps us understand how to begin, which is why we included them in this disclosure. With FIGS. 2-4 understood, the material in FIGS. 6 and 7A-C will appear more like one foot steps, as opposed to FIG. 6 looking like a four foot step.

Figure 5:
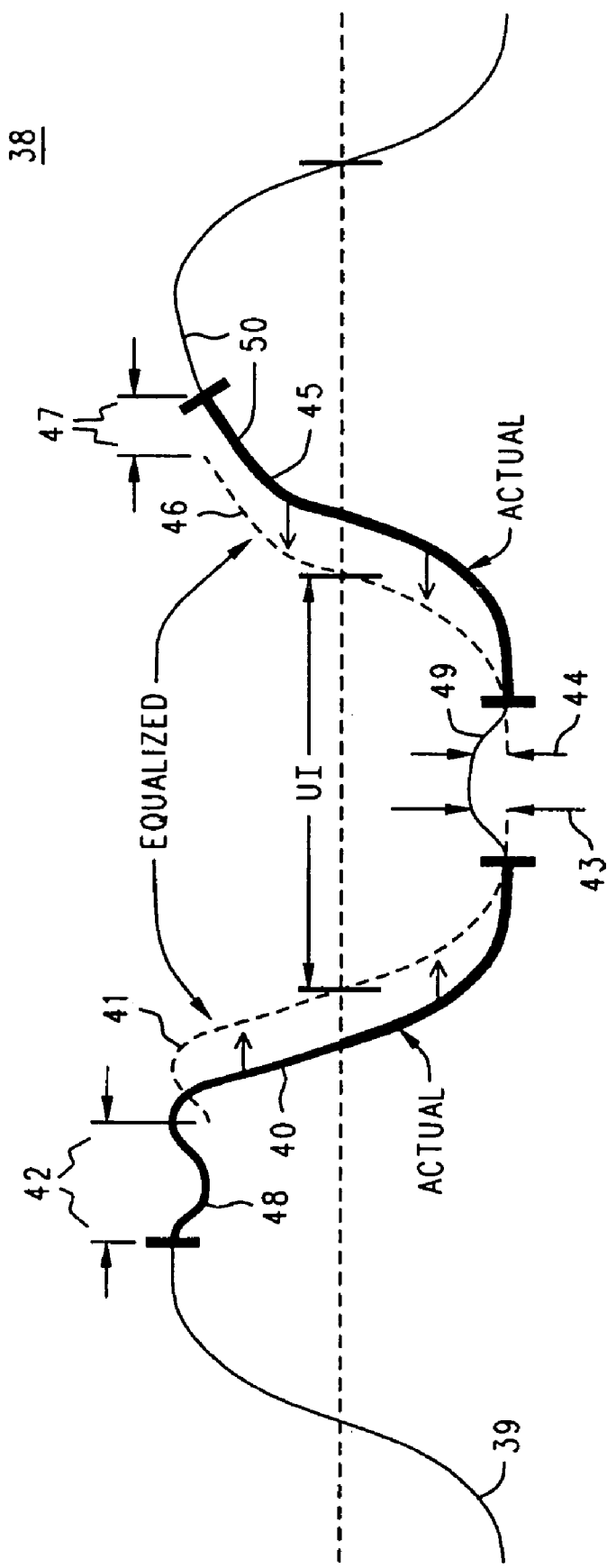
FIG. 5 is a waveform diagram illustrating where discontinuities in an equalized waveform can arise when using simple time shifted interpolation to equalize DDJ timing jitter.

That said, what then are the circumstances that limit the applicability of the basic time shifted interpolation technique of FIGS. 2-4? To see the answer we turn to FIG. 5, which is an illustration 38 of a situation similar to the one in FIG. 2, but where the asserted regions of a signal 39 are not well behaved (at 48, 49 and 50). So, for example, the solid dots and asterisks (referring to FIGS. 3 and 4) are not indistinguishable within the region 42, because the dip 48 keeps 'b' from approaching zero. The result is a dilemma about how to connect the left-hand end of dotted line 41 onto the light solid line 39 at the left-hand end of solid heavy line 40. Similarly, hump 49 causes continuity problems at the locations of arrows 43 and 44. And simply because region 50 is not flat (dv/dt close to zero), the right-hand end of dotted line 46 does not overlap the right-hand end of heavy solid line 45, and no solid dots are available to substitute for missing asterisks without causing an apparent glitch that really isn't there. And upon reflection, it is clear that just about anything we do to patch up such discontinuities will likely introduce features into the equalized waveform that are inaccurate. Thus, it is clear that the time shifted interpolation technique needs some help if it is to be used on waveforms that are not always well behaved.

Figure 6:
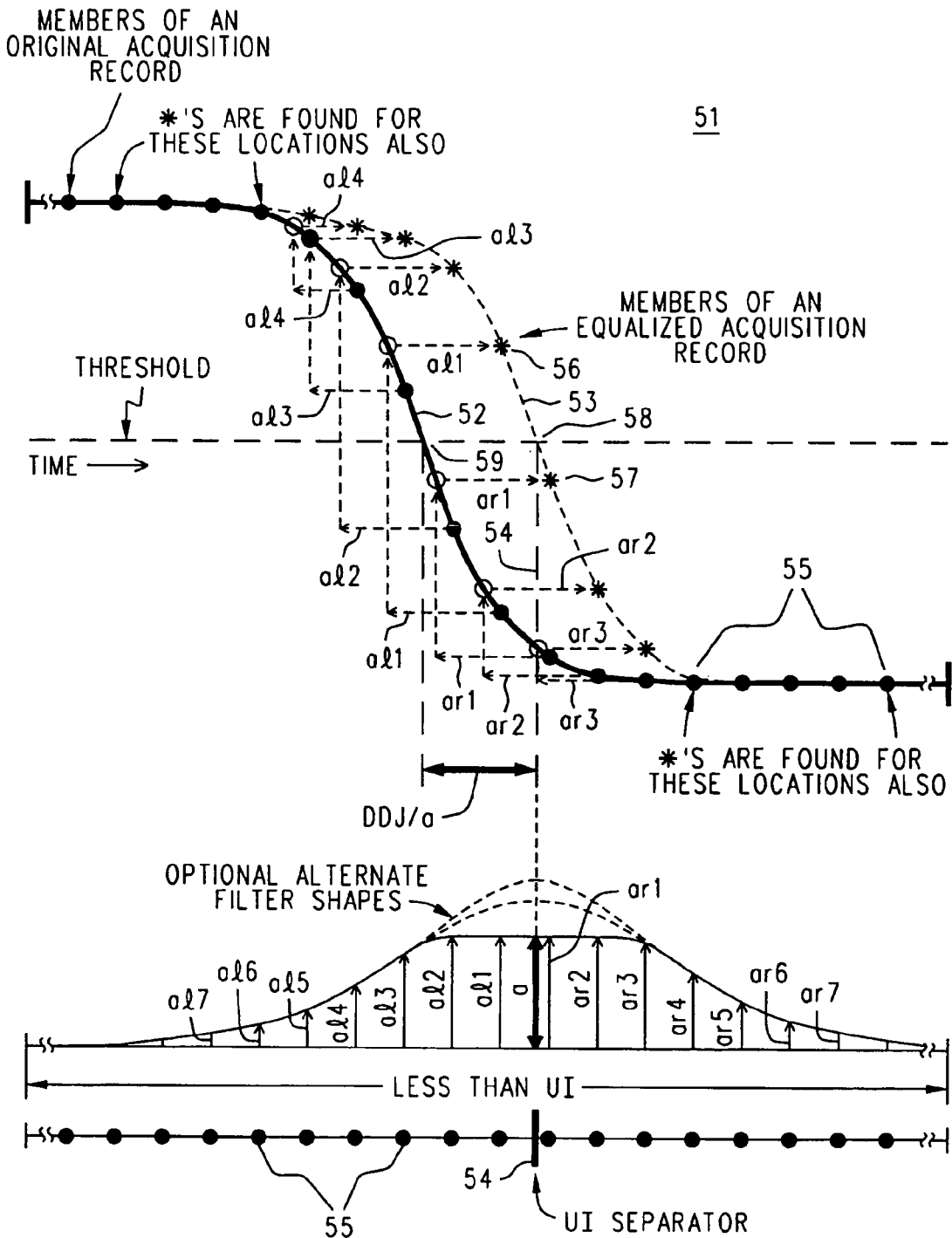
FIG. 6 is a waveform diagram illustrating filtered time shifted interpolation.

FIG. 6 is an illustration 51 of how the time shifted interpolation technique can be assisted in coping with real world warts on a waveform being equalized for timing jitter. The idea is to pick a region over which the transition is to be equalized, say, from about the middle of one UI to the middle of the next (as we did with the heavy solid line of FIG. 2). This same convention is followed in the top half of FIG. 6. The top half of FIG. 6 shows that a transition 52 is retarded (after the manner of FIG. 3) using a modified time shifted interpolation technique to become an equalized transition 53. The nature of the modification is this: Near the point in time (54) when the transition ought to cross the threshold the values for 'a' used in the three-sided-box transformation are equal or essentially equal to the value of DDJ for that transition, but are diminished on either side of that point in time (54). The bottom half of FIG. 6 shows how this is done. The notation is that 'a' is the actual value for DDJ at this transition, while al1, al2, al3, . . . al7, . . . are diminished a-like values to the left of 'a', while ar1, ar2, . . . are to the right. A computational rule, which may be a Finite Impulse Response (FIR) Filter, provides the various diminished values in response to an 'a' input. We have shown a filter with a flat top such that al2 through ar2 receive the same value as input for 'a', although this is not necessary. A flat topped filter assists in producing equalized points (represented by the asterisks 56 and 57) that describe a (dotted) line that crosses the threshold at the correct location (58). As an alternative, the shape of the filter could be more like that of, or be that of, the familiar bell curve (as indicated by the dotted lines above the filter), and only a slight error would be produced owing to the curvature at the top to the filter.

On the other hand, notice how the filter is centered around the 'correct' location in time (54). Such centering is an important condition. For example, if the filter were instead centered around the actual threshold crossing (59), then the filter would definitely have to be flat on top to avoid introducing an inflection in the equalized waveform in the vicinity of the threshold. Centering may involve some asymmetry in the production of the diminished 'a' values. So, for example, notice how al3 is smaller than ar3. That situation arises because the correct location of 'a' does not fall on a solid dot 55. This is typical, as the general case is that it will not.

Now observe that as the diminished 'a' values are used at increasing distances away from the center of the filter, the vertical 'b' values that result for the three-sided-box transform are commensurately reduced. This gradual reduction in 'b' values causes the produced asterisks to converge onto the more-distant-from-filter-center solid dots, regardless of whether or not those solid dots describe a line segment with a dv/dt of zero. That is, if the solid dots 55 described a perturbation such as 48 in FIG. 5, then the asterisks of the dotted line would begin to track that perturbation. The extent to which the perturbation is faithfully reproduced depends upon where on the tail of the filter it begins to occur; the more diminished the 'a' values are the more faithful the tracking. Perturbations that are filtered by locations well up on the filter skirts (i.e., more near the center of the filter) will be attenuated somewhat. In any case, the convergence is gradual, so that price we pay for avoiding an outright discontinuity is a graceful distortion (in the equalized result) of any such feature being converged upon.

It will thus be appreciated that the filtered time shifted interpolation of FIG. 6 provides both correct equalization and avoids introducing discontinuities in the equalized result that would otherwise be produced by non-ideal behavior in the asserted regions of the signal being equalized. It will further be appreciated that another example, similar to FIG. 6, but corresponding to the equalize-by-advancing situation of FIG. 4, is implied. We have omitted that example in the interests of brevity.

Figure 7B:
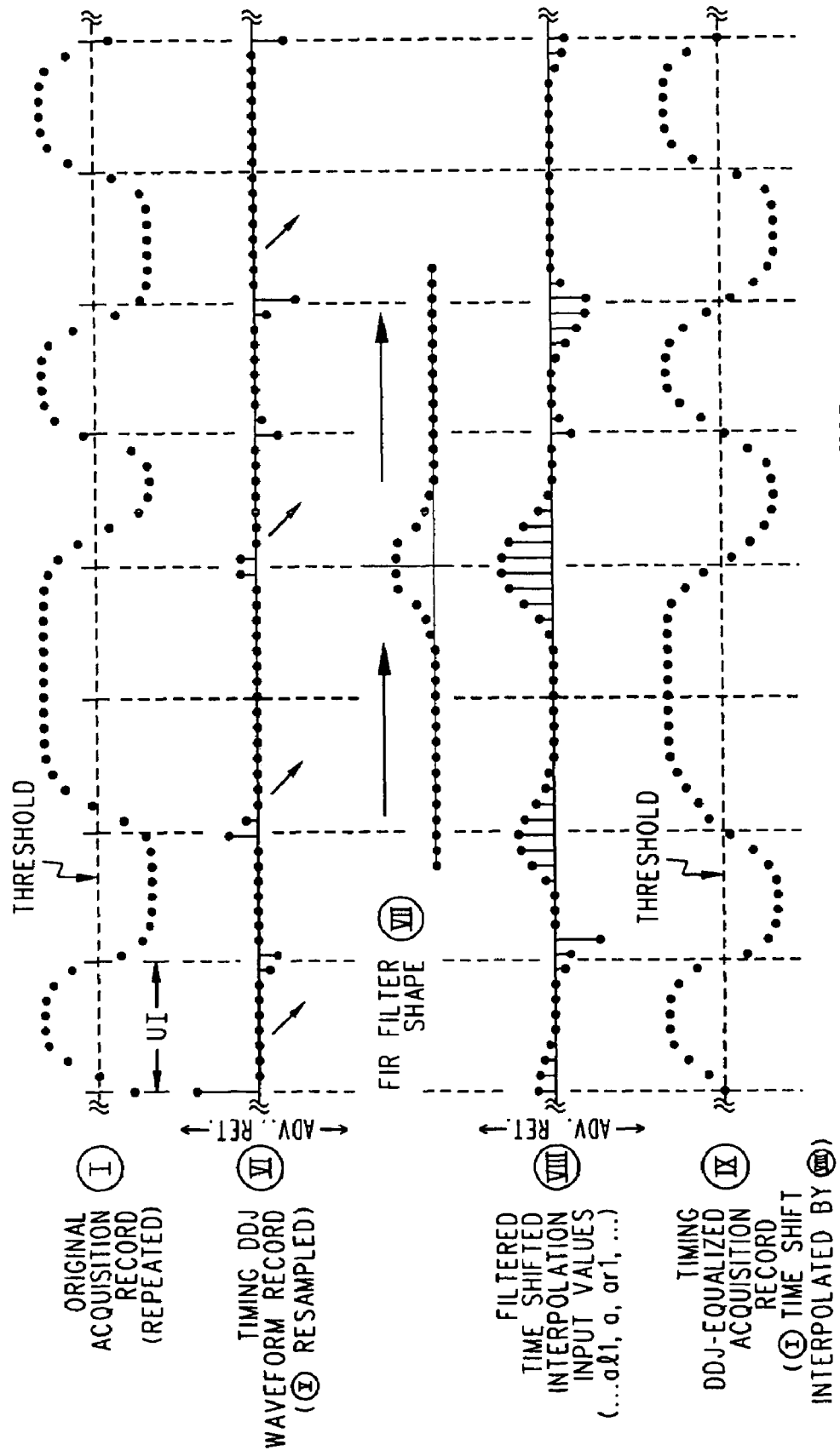

Refer now to FIGS. 7A-C, wherein is shown a simplified collection of waveform diagrams useful in understanding how an Original Acquisition Record obtained in a DSO (or an equivalent) environment can be equalized for timing DDJ using the time shifted interpolation technique.

Part I of FIG. 7A depicts a portion of an Original Acquisition Record that is representative of the analog voltage versus time behavior of an applied digital data signal. That digital data signal may be arbitrary, in that it may be a pseudo random sequence of bits, actual 'live' data occurring while the SUT is in use, or, some other favorite sequence of bits. If it is an applied Test Pattern for which DDJ is yet to be determined, then other than wanting it to have an adequate number of data events of interest, and have a reasonable distribution of ONEs and ZEROs, we mainly want it to be long enough for self-cancellation of the effects of RJ and PJ to occur within collections of the same data event (i.e., for each Descriptor). If it is live data and DDJ has already been characterized, then there are no particular constraints on the nature of the data. In either case, as far as equalization is concerned, it is arbitrary Test Data.

Part I is not depicted as a solid line, as is customary for time variant waveforms. Instead, we have shown it as a sequence of closely spaced solid dots whose interpretation is the same as in FIGS. 3 and 4. That is, the solid dots represent voltages that the actual analog voltage waveform would have at the corresponding discrete points in time, and they are spaced 'closely enough' for whatever purpose is at hand.

The tangible form that the Original Acquisition Record has is that of a data structure in memory (whether in actual RAM or on a Disc) managed by a Jitter Analysis subsystem that is preferably a part of an embedded control system for a DSO. That is, it is (or is equivalent to) a file of consecutive numbers, possibly including some heading information.

Also shown in part I is a dashed horizontal line that represents the threshold to be used in deciding the logical value of ONE or ZERO. The dashed line is not part of the Record in the same way as the solid dots are, and if present is probably only indicated once as an entry in a heading.

In Part II of FIG. 7A we indicate where the boundaries of the UIs are (the small tic marks) and where within each UI (at the arrows) the decisions are made for the logical values of the digital waveform represented by Part I. This raises the issue of how the UI is known. It will be known either because a clock signal (not shown) accompanied the data signal, or, because the Test Data was simply sampled to produce Part I, which was then inspected to decide, based on an average over all the Test Data, what the UI ought to be and how best to fit it to that Test Data. In any event, we are not indicating that Part II represents an actual waveform that can be observed, just that certain activities or conditions occur at the times indicated. Further, we have again shown the same arrangement of dots that were used in Part I. This is to remind us that those dots represent the granularity of the data and of the processes for manipulating that data. That is what we mean when we say that the dots in Part II (or for any other Part) 'line up' with the dots of Part I.

In Part III of FIG. 7A is shown a Logical Value Record that is obtained from noting the value within the Original Acquisition Record relative to the threshold at the times indicated by the arrows of Part II. The Logical Value Record is preferably a data structure (or file) of consecutive values of ONE and ZERO. As far a we are concerned here, its main use is to decide, given an edge in the Test Data, what Descriptor is in effect, based on the surrounding bit behaviors. It is from that Descriptor, of course, that an associated value of DDJ is obtained, either by indexing an LUT by the Descriptor or by using the Descriptor's components as independent variables in a computational rule.

For convenience and clarity, we have also included Parts IV and V in FIG. 7A, even though they are primarily concerned with the finding of DDJ (for timing), rather than with the immediate production of an Equalized Acquisition Record. Briefly, Part IV represents absolute time versus the total error for consecutive instances of UIs. Edges in the Original Acquisition Record that occur when they are supposed to will appear in Part IV as dots. Edges that occur early are shown a descending line segments whose length are proportional to the amount of error, while ascending lines similarly represent edges that occur late. The Timing TJ TIE Record of Part IV will have been processed in accordance with the Template in use and the actual record of data events (which Descriptors occurred), as indicated by Part III, to produce the (timing) DDJ data for the particular SUT at hand. That processing is described in the incorporated METHOD OF FINDING DATA DEPENDENT . . . JITTER . . . . The result of these determinations is the Timing DDJ TIE Record of Part V. It is another data structure containing a consecutive list of DDJ error amounts, and we represent it in Part V in a manner similar to Part IV.

In both Parts IV and V we use a hollow circle in the representation of these Records to indicate some form of placeholder mechanism to represent the absence of an edge (in the example that arises because of two consecutive ONES). This amounts to a minor implementation detail that we include here for completeness and to ward off any potential confusion. Suppose the Records of Parts IV and V were arrays indexed by a pointer moved according to a transition location of interest. Then it might be the case that we simply don't care what is in those Records at locations corresponding to missing edges, since those locations would presumably never be indexed. On the other hand, it might be the case that a routine or a hardware mechanism simply traverses an entire record structure expecting there to be the right number of locations, and for the content of each location to be non-poisonous. That is, if the location corresponds to an actual transition, then it contains a reasonable actual value, while if corresponds to a missing transition, then the value there (value of WHAT?) is at least benign. Zero is a good benign value.

This brings us now to the Timing DDJ Waveform Record of Part VI in FIG. 7B. It outwardly resembles Part V, but its structure is that of an Acquisition Record, such as that of Part I. The Timing DDJ Waveform Record represents DDJ versus time for each edge in the Test Data (i.e., for each edge in Part I or in Part III), and is obtained from the Descriptor versus DDJ correspondence mechanism (i.e., an LUT or a computational rule). The sizes and directions of the entries in the Timing DDJ Waveform Record are indicative of the amount and sign of the DDJ at the various edges. These DDJ values are not the same as the corresponding Timing TJ TIE entries of Part IV, since the latter include PJ and RJ, whose presence might increase, decrease or even accidently cancel the DDJ that would otherwise be manifested at that location in the Test Data. Thus, note that the zero-TIE-value dot in the Timing TJ TIE Record has a corresponding non-zero entry in the Timing DDJ Waveform Record, and that often the respective entries in the two Records have different magnitudes and signs.

The Timing DDJ Waveform Record of Part VI is put into an acquisition-style record because we are going to process it from one end to the other with an FIR Filter. That is, we need it to be a dense representation of an actual time domain waveform that has the same resolution, or granularity, as the Original Acquisition Record we are going to equalize. By 'dense representation' we mean that it has the same dot density as, and that there is a one-to-one correspondence with, the dots in Part I. The plan is to run the data in the Timing DDJ Waveform Record of Part VI through the FIR represented by Part VII, to get the Filtered Time Shifted Interpolation Values of Part VIII. That result is not a voltage error versus time waveform, to be sure! It is instead the filtered (variable, maximum strength in the middle, vanishes at the ends) DDJ inputs to the three-sided-box transformation of FIGS. 3 and 4 (i.e., . . . al3, al2, al1, a, ar1, ar2, ar3, . . . ).

Also notice that some of the entries in the Timing DDJ Waveform Record of Part VI are pairs of entries that are sometimes equal, sometime unequal, and sometimes just a sole entry. This behavior arises because the FIR Filter of Part VII is (usually) not 'centered' on one of the solid dots, but instead on where the transition (zero crossing) ought to be (the small tic marks in Part I). Thus, the acquisition-style record we are using to store the Timing DDJ Waveform Record can't indicate a value for DDJ at a transition using a single entry except at such locations in the Record where there is alignment with a dot. This business of the paired entries amounts to the discrete approximation of an impulse in a continuous system, where the impulse does not occur at one of the discrete times found in the approximation, and will be appreciated by those who are familiar with digital filters.

The FIR Filter is conceptually a mechanism that is fed, at an input, consecutive values along a waveform. After some latency, at an output there begin to occur corresponding output values. We want to create an output that can be used as an input to the three-sided-box transform that performs the time shifted interpolation (i.e., . . . al3, al2, al1, a, ar1, ar2, ar3, . . . ). Those values (Part VIII) are, dot by combined with the waveform of Part I via time shifted interpolation to create the waveform of Part IX. Our desire for the dots to 'line up' is thus appreciated. It is clear that Part VI could have a tangible realization that was indeed a data structure similar or identical to that of Part I. That is, it could be a long file with regularly placed DDJ values having actual intervening values of zero between each consecutive pair of DDJ values. No doubt about it, it could be built that way, but unless there were some other reason to do so (simplicity is good), it probably represents a waste of memory. Instead, one might implement a more compact representation in memory that is similar to that of the TIE Record (a sequence of errors with no intervening zeros), and access it with a routine that supplies 'synthesized' intervening zeros to the FIR Filter as they are needed. The filter will never know the difference . . . .

And in connection with a related topic, the FIR Filter has latency, in that it consumes the first several input values without returning a valid output value. To get the FIR Filter going at the very beginning of the process of its filtering of the Timing DDJ Waveform Record, it is preferable if that Record actually includes (or 'effectively includes' via synthesis, as in the preceding paragraph) some initial 'sacrificial values' that are used just to overcome the latency of the filter. An alternative is to simply throw away some time at start-up.

And now for the FIR Filter of Part VII. As mentioned, its input is the Timing DDJ Waveform Record of Part VI, and its output is the Filtered Time Shifted Interpolation Input Values of Part VIII. The FIR Filter is a conventional FIR filter, although its number of stages and coefficients have been chosen to produce a specific effect, namely, that once latency is satisfied its output (Part VIII) can be used to equalize the waveform of Part I (the Original Acquisition Record) to produce an Equalized Acquisition Record (equalized for timing, which is to say, for edge location) as indicated in Part IX.

Meanwhile, the nature of the Timing DDJ-Equalized Acquisition Record of Part IX will be appreciated as being another data structure, similar or identical in form to that of the Original Acquisition Record of Part I. It has the general shape of the Original Acquisition Record, save that it has been adjusted without the introduction of discontinuities, to remove DDJ. It still has any RJ or PJ that were present in the actual Test Data. There are no discontinuities because the skirts of the FIR Filter return to the base line within about one half of a UI on either side of center. The scope of the filter could be somewhat larger than one UI and the corrections to consecutive bits in the data signal would still essentially be independent (i.e., would not interfere with one another).

The reader is reminded that the magic of going from Part VIII to Part IX is the previously explained subject matter of FIGS. 3 and 4.

We now shift gears, as it were, to another technique that can be used to equalize both DDJ timing jitter and DDJ voltage jitter. Recall the example of FIG. 2, but now, instead of filtered time shifted interpolation, we are going to use a technique that uses the addition of a compensatory voltage waveform to the measured one to create the equalized one. This will give rise to two examples, one for timing jitter and one for voltage jitter, but each using the compensatory voltage waveform technique. In these examples we shall use again the Part I Original Acquisition Record of FIGS. 7A-B. FIGS. 8A-C will deal with DDJ timing jitter, while FIG. 9 (corresponds to FIG. 2, but for voltage jitter) and FIGS. 10A-B will deal with the voltage jitter example.

Refer now to FIGS. 8A-C, wherein is shown a simplified collection of waveform diagrams useful in understanding how an Acquisition Record obtained in a DSO (or an equivalent) environment can be equalized for timing DDJ.

Part I of FIG. 8A depicts a portion of an Original Acquisition Record that is representative of the analog voltage versus time behavior of an applied digital data signal. It is the identical example we have already encountered, and all that was said about it before continues to apply.

Also shown in part I is a dashed horizontal line that represents the threshold to be used in deciding the logical value of ONE or ZERO. The dashed line is not part of the Record in the same way as the dots are, and if present is probably only indicated once as an entry in a heading.

In Part II we indicate where the boundaries of the U's are (the small tic marks) and where within each UI (at the arrows) the decisions are made for the logical values of the digital waveform represented by Part I. This raises the issue of how the UI is known. It will be known either because a clock signal (not shown) accompanied the data signal, or, because the Test Data was simply sampled to produce Part I, which was then inspected to decide, based on an average over all the Test Data, what the UI ought to be and how best to fit it to that Test Data. This, too, is as explained in the previous examples.

In Part III is shown a Logical Value Record that is obtained from noting the value within the Original Acquisition Record relative to the threshold at the times indicated by the arrows. The Logical Value Record is preferably a data structure (or file) of consecutive values of ONE and ZERO. As far a we are concerned here, its main use is to decide, given an edge in the Test Data, what Descriptor is in effect, based on the surrounding bit behaviors. It is from that Descriptor, of course, that an associated value of DDJ is obtained, either by indexing an LUT by the Descriptor or by using the Descriptor's components as independent variables in a computational rule.

For convenience and clarity, we have also included Parts IV and V in FIGS. 8A-B, even though they are primarily concerned with the finding of DDJ (for timing), rather than with the immediate production of an Equalized Acquisition Record. The conventions used here are also as previously described in connection with FIGS. 7A-B, and their explanations need not be repeated.

Part VI is an acquisition-style record that indicates the signed slew rate of Part I, and is found by inspection of the transitions therein. The units are volts/(unit of time).

Part VII is another acquisition-style record that is the entry by entry product of Part V times Part VI. This does two useful things that will soon become apparent. First, it accounts for whether an edge is rising or falling (which is quite different from whether a timing correction for DDJ requires advancing or retarding). Basically, it combines whether to advance or retard (the sign of DDJ in Part V) with the direction of the edge being equalized (the sign of the slew rate) to get the polarity of the compensatory voltage excursion that is to be produced. Second, it allows the magnitude of the slew rate to influence the size and slew rate of the compensatory voltage excursion. (The actual excursion will come from a FIR Filter of fixed aperture, or scope, so the effect is to adjust the slew rate of the compensatory excursion to better match that of the edge being equalized. Faster edges need stronger fixes, so we excite the FIR Filter with an impulse of greater amplitude . . . .)

This brings us now to the Timing DDJ Waveform Record of Part VIII. It corresponds to Part V, in that it is an acquisition-style record whose contents are closely related to those of the Timing DDJ TIE Record of Part V. Aside from the difference in format, it also means something else, and in general, will not have contents that are "the same" as those of the Timing DDJ TIE Record of Part V. The Timing DDJ Waveform Record represents in acquisition-record-style DDJ versus time for each edge in the Test Data (i.e., for each edge in Part I or in Part III), and is initially obtained from the Descriptor versus DDJ correspondence mechanism (i.e., an LUT or a computational rule), but are subsequently modified to become the TIE-style DDJ Correction Record of Part VII. The sizes and directions of the entries in the Timing DDJ Waveform Record are thus indicative of the amount and sign of the needed compensatory voltage excursion for the various edges.

Part VIII is Part VII re-sampled into acquisition-record-style (notice the closely spaced solid dots) because we are going to process it from one end to the other with an FIR Filter. That is, we need it to be a dense representation of an actual time domain waveform. It is not a voltage error versus time waveform, to be sure! It is instead a time-error-owing-to-DDJ versus time waveform. By 'dense representation' we mean that it has the same dot density as, and that there is a one-to-one correspondence with, the solid dots in Part I. The plan is to run the data in the Timing DDJ Waveform Record of Part VIII through the FIR represented by Part IX, to get the Timing DDJ Correction Waveform Record of Part X. Just as was done in connection with Part VI of FIG. 7B, some of the entries in the Timing DDJ Correction Waveform Record of Part X of FIG. 8C are pairs of entries that are sometimes equal, sometime unequal, and sometimes just a sole entry. This behavior arises because the FIR Filter of Part IX is (usually) not 'centered' on one of the solid dots, but instead on where the transition (zero crossing) ought to be (the small tic marks in Part I). Thus, the acquisition-style record we are using to store the Timing DDJ Waveform Record can't indicate a value for DDJ at a transition using a single entry except at such locations in the Record where there is alignment with a dot. The paired entries amount to the discrete approximation of an impulse in a continuous system, where the impulse does not occur at one of the discrete times found in the approximation, and will be appreciated by those who are familiar with digital filters.

The FIR Filter is conceptually a mechanism that is fed, at an input, consecutive values along a waveform. After some latency, at an output there begin to occur corresponding output values. We want to create an output that is a waveform (Part X) that can be added, dot by dot, to the waveform of Part I to create the waveform of Part XI. Our desire for the dots to 'line up' is thus appreciated. It is clear that Part VIII could have a tangible realization that was indeed a data structure similar or identical to that of Part I. That is, it could be a long file with regularly placed DDJ values having actual intervening values of zero between each consecutive pair of DDJ values. But, as described in connection with the FIR Filter of Part VII in FIG. 7B, one could instead implement a more compact representation in memory that is similar to that of the TIE Record (a sequence of errors with no intervening zeros), and access it with a routine that supplies 'synthesized' intervening zeros to the FIR Filter as they are needed. As before, the filter would never know the difference . . . . Furthermore, the issue of filter latency could also be dealt with as previously described.

And now for the FIR Filter of Part IX. As mentioned, its input is the Timing DDJ Waveform Record of Part VIII, and its output is the Timing DDJ Correction Waveform Record of Part X. The FIR Filter is a conventional FIR filter, although its number of stages and coefficients have been chosen to produce a specific effect, namely, that once latency is satisfied its output waveform (Part X) can be added, dot for dot, to the waveform of Part I (the Original Acquisition Record) to produce the Timing DDJ-Equalized Acquisition Record (equalized for timing, which is to say, for edge location) of Part XI.

Meanwhile, the nature of the Equalized Acquisition Record of Part XI will be appreciated as being another data structure, similar or identical in structural form to that of the Original Acquisition Record of Part I. It has the general shape of the Original Acquisition Record, save that it has been adjusted without the introduction of discontinuities, to remove timing DDJ. It still has any RJ or PJ that were present in the actual Test Data. There are no discontinuities because the skirts of the FIR Filter return to the base line within about one half of a UI on either side of the center of the filter. We have taken the view that Part X represents a compensatory correction to be added to Part I to produce Part XI. One could be perverse and insist that there is a DDJ error that is to be subtracted out, instead. In that case, change the sign of the FIR Filter's output, and do a subtraction of Part X from Part I to produce Part XI.

We turn now to the use of the compensatory voltage waveform technique to equalize for voltage DDJ. Before proceeding with a detailed description of how to equalize for voltage DDJ using the compensatory voltage waveform technique, we should briefly discuss the type of voltage behavior that will qualify as voltage DDJ. There are different kinds of voltage noise that a signal might exhibit. One kind would be a high frequency type that is often referred to as "grass." While such a phenomenon might be described with a single parameter (e.g., of X-many volts RMS or P-P), it is unlikely that we can correct for that condition by a compensatory application of another voltage having that same measurement. (Even assuming that it is really DDJ and not RJ, fifty millivolts of high frequency noise cannot be removed by adding 'minus fifty millivolts' of similar noise, unless we had the exact waveform of that noise, which is not too likely . . . .) The proper approach for elimination of such noise is probably to use a suitable low-pass filter, especially if the bandwidth of the systems involved would allow such noise to get into the Original Acquisition Record. On the other hand, if what we have is what appears to be steady offsets within the asserted regions that are and remain correlated with the data content of the signal, then we have voltage DDJ that both has a single parameter description (per Descriptor) and that can be compensated by a suitable compensatory voltage also having that same single parameter description. However, there is a slippery slope that leads to confusing voltage DDJ with long period voltage drift/offset that affects all asserted regions equally, and that is thus not really data dependent (except in a trivial way not really intended to fall within the meaning 'varies' according to the data). The defense against this is within the DDJ discovery and characterization mechanism. There is an averaging operation that is relied upon to provide self-cancellation for such 'common mode' errors that occur uniformly. As mentioned in the incorporated METHOD OF FINDING DATA DEPENDENT . . . JITTER . . . the reference value that is used to determine what is voltage error in the first place is a 'suitable average.' Accordingly, let us assume that an average of all the asserted ONEs and a separate average of all the asserted ZEROs are found and then used as the respective reference values for Descriptors within the DDJ discovery and characterization process. That is well and good, as it guards against the possibility that a DC offset which has crept into the signal will be mistaken as voltage DDJ. On the other hand, if we suspect that 'real' DDJ is slowly changing with time, say, as a function of temperature, then we have no choice but to periodically re-measure it, which, it seems, is as it should be. In any event, our explanation will proceed assuming that we have identified some 'real' voltage DDJ of the bit-by-bit offset variety that retains a stable description for a significant length of time.

Figure 9:
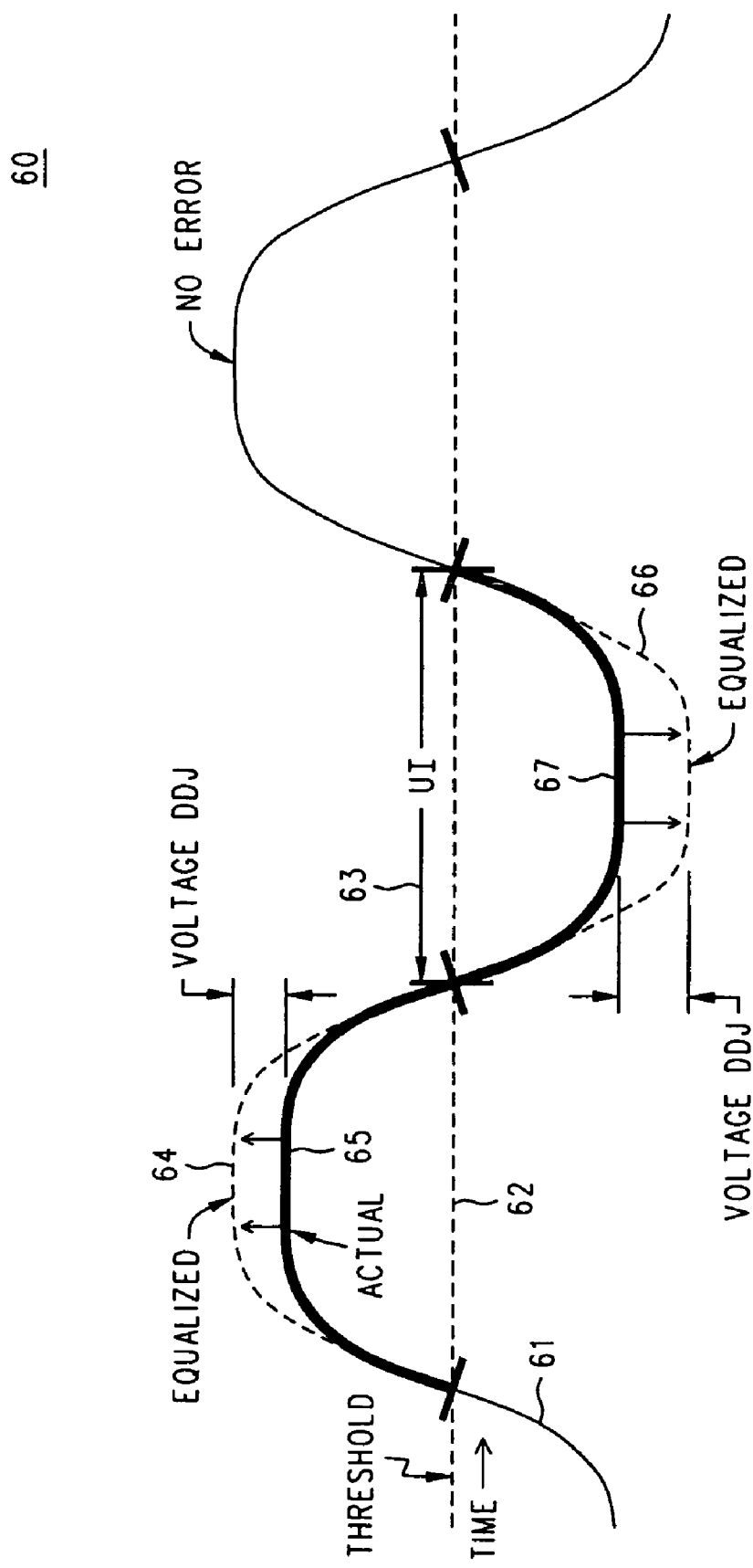
FIG. 9 is a waveform diagram illustrating the basic idea of DDJ voltage jitter equalization.

Accordingly, refer now to FIG. 9, which is a waveform illustration 60 depicting three bit-cycles of a signal 61 whose crossings of a threshold 62 are a Unit Interval 63 apart. While other forms of jitter might be present, let us assume for simplicity that only voltage DDJ is present, and that its values are known. That is, we can say that dotted active/asserted region 64 is what should have occurred for the left-most complete bit, while the heavy line segment 65 indicates what actually did occur. Similarly, dotted line 66 is the ideal replacement for the actual heavy line for region 67. If a waveform equalized for voltage DDJ were to be created for signal 61, then what we seek is a way to alter the data describing the heavy lines to describe instead the dotted lines. It will be noted that the heavy solid lines extend from about the start of one UI to about the start of the subsequent UI. The implication here is (for the present, anyway) that we want whatever we do to fix one instance of voltage DDJ occurring within a time frame to not materially overlap what might be done to fix an adjacent instance of voltage DDJ. That is, we want our corrections for the voltage DDJ within each bit to be independent of each other.

Figure 10A:
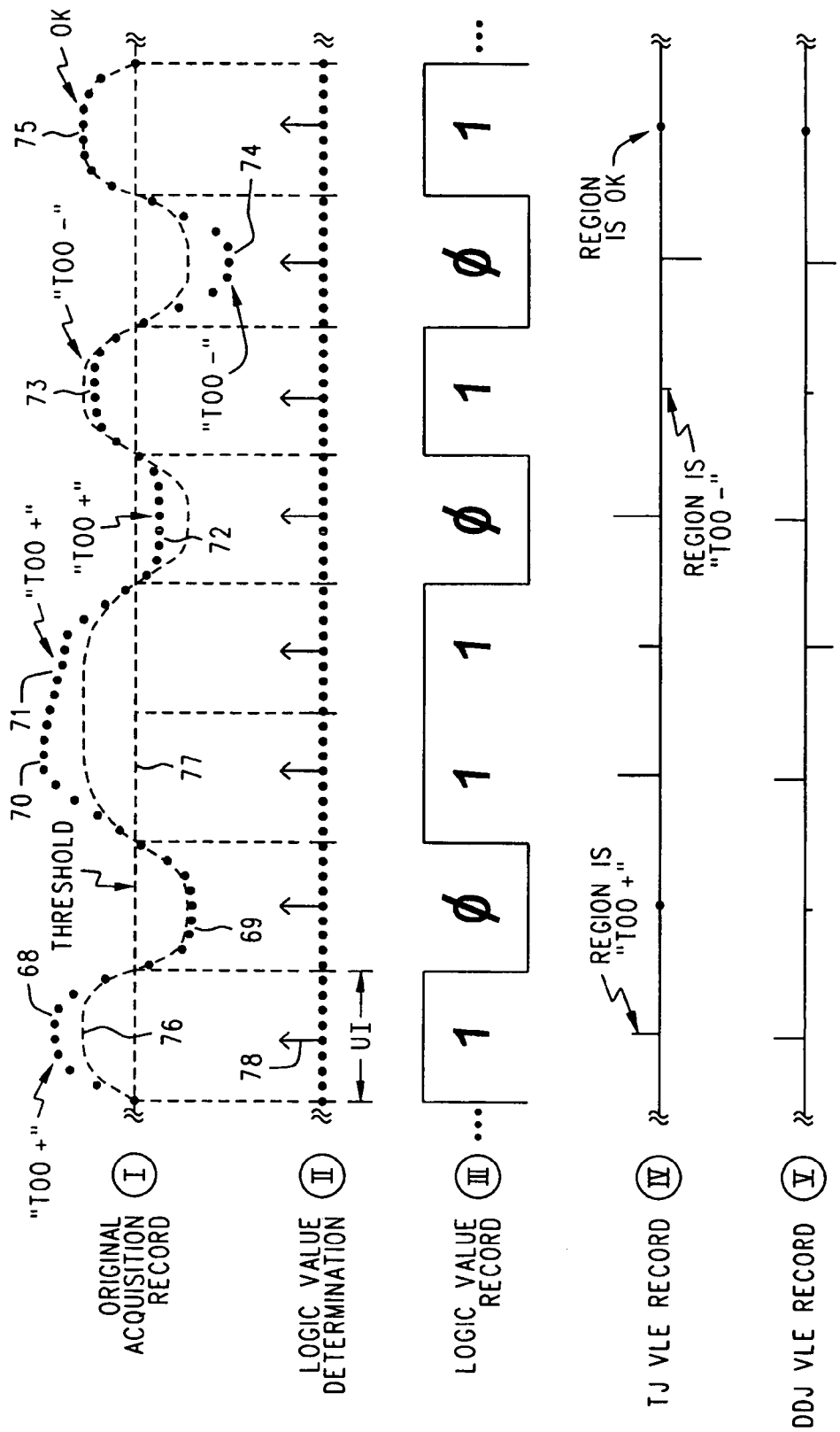

FIGS. 10A-B illustrate, after the fashion of FIGS. 8A-C, an example of performing voltage DDJ equalization upon a data waveform represented with an Original Acquisition Record in Part I by using the compensatory voltage waveform technique. Part I has been kept essentially the same as in FIGS. 7 and 8, save that it now has no timing jitter, and instead exhibits voltage jitter that includes voltage DDJ.

In Part I of FIG. 10A the solid dots represent actual samples, and although regularly spaced, there is, as before, not necessarily an exact integral number of solid dots contained within each UI. The dashed line 76 represents the ideal voltage that the bits should have, while dashed line 77 represents the threshold for determining logical values. Beginning at the left of the diagram in FIG. 10A, the actual samples of the bit 68 are "too+", which is also true in varying degree for bits 70, 71 and 72. It can be seen that bits 69, 73 and 74 are "too−". We use the terminology "+" and "−" in place of "high" and "low" to avoid confusion with the contingent choice of what polarity represents HIGH, LOW, TRUE and FALSE for the logic family in use.

The arrows 78 in Part II indicate the points in time when the Total Jitter error voltage for an asserted central region of a bit value is ascertained, assuming of course, that we are prepared to declare what the sampled value should have been for an asserted ONE and for an asserted ZERO. These ideal correct voltages can be simply declared, or determined by some measurement strategy, such as averaging. In any event, the measured error is the difference between the assumed ideal value and the actual measured value. Before moving on, we should emphasize that a single error value is taken for each bit, and not a sequence within the bit that allows the discovery of the shape of the asserted region. (We actually could create such a sequence, as there is sufficient information to do so if there is also an assumed ideal shape. To do this would add considerably to the overhead of creating the equalized waveform—imagine an arrow 78 at every dot. Even if we were to do this we would probably only use it to get an average error that is, say, an area divided by a length along the Time axis, which is again a single error value. The reader is reminded that we are about to equalize for voltage DDJ, and THAT QUANTITY will come to us a single value that 'has no shape.' THAT is the main reason that we are content to begin with a measured Total Jitter voltage error that is a single value, in conjunction with the fact that how we apply the DDJ correction will leave much of the original shape intact, anyway.)

As before, Part III illustrates the sequence of Logical Values that is recovered from the Test Data, and Part IV is a TJ TIE-style Record, only now it is a VLE (Voltage Level Error) Record instead of a TIE Record. It has the same format as a TIE Record, except that its contents are voltage errors instead of timing errors. We show Parts III and IV largely for completeness, as they are principally of operational interest to the mechanism that finds voltage DDJ (which we are assuming is 'offstage' someplace, and which is also the purview of the incorporated METHOD OF FINDING DATA DEPENDENT . . . JITTER . . . .) Part V illustrates the DDJ VLE Record that is subsequently found by using that mechanism and that is assumed to afflict the data signal of Part I. (Once again, we remind the reader that DDJ is not the only voltage jitter that the signal may have, and that it is rash to draw firm conclusions about what DDJ might be from just a cursory inspection of the TJ VLE Record of Part IV.)

We turn now to FIG. 10B, where as before, Part I has been repeated for convenience. In part VI the DDJ VLE Record of Part V has been re-sampled to create a Voltage DDJ Waveform Record. That is, the information of Part V has been recast as if it were a time domain waveform, using the sample timing regime of the solid black dots. At this point we now have voltage DDJ for the Test Data represented as a sequence of voltage impulses. The plan is to put those impulses (of Part VI) through a suitable FIR Filter to create the Voltage DDJ Correction Waveform Record of Part VIII. The shape of the FIR Filter resembles the ideal shape of the asserted regions, so each impulse of Part VI is re-shaped to apply in varying proportions to the entire bit for which it corresponds. This mitigates the inherent simplicity in describing voltage DDJ for a bit as a mere number. Note that once FIR Filter latency and start-up issues are resolved (per earlier discussions in connection with FIGS. 7 and 8) the Voltage DDJ Correction Record Waveform of Part VIII is in dot for dot correspondence with the description of the Original Acquisition Record of Part I, and can be arithmetically combined, dot for dot, with it.

In the example of FIG. 10, the Voltage DDJ Correction Waveform of Part VIII has been produced as an error signal that is to be subtracted from Part I to create the equalized result. That equalized result is the Voltage DDJ-Equalized Acquisition Record of Part IX. Note that the waveform is equalized for DDJ only, and that, for example, it still exhibits a hump 79 that arises from the particular combination of TJ and DDJ at that bit.

We now consider various alternate embodiments and extensions for the equalization techniques set out above. The first of these concerns deals with equalization for timing DDJ. We have disclosed two basic techniques to do that: use of a compensatory voltage waveform and filtered time shifted interpolation. It is possible to combine these two techniques.

So, suppose for some reason you decided that it was a good idea to use filtered time shifted interpolation to correct for, say, 75% of timing DDJ and use a compensatory voltage waveform for the other 25%. Here, in general, is how to proceed. First, decide which to do first. It appears that the techniques may not be commutative, although it seems the choice would matter mostly from the standpoint of convenience. The selected technique would then be applied, save that the amount of timing DDJ used would be scaled by the associated percentage. Now there appears a choice concerning how to proceed. One way to proceed is to apply the initial technique completely (i.e., apply all its steps using the 75% of DDJ), so that a partially equalized acquisition record in hand. One would then treat that partially equalized acquisition record as if it were a new original acquisition record which then receives the remaining amount of equalization from a likewise complete application of the other technique. The result of that would be the desired equalized result. A second way to proceed is to perform the filtered time shifted interpolation technique first (FIG. 7B), after Part XI of which a (75%) partial result would be in hand. Then proceed with the compensatory voltage waveform technique (FIGS. 8A-C), starting with the actual (same) Original Acquisition Record and producing a Part X (25%) Timing DDJ Correction Waveform. That 25% Part X result could then just be added to the partial Part XI 75% result from the time shifted interpolation technique to obtain a final 100% equalized result.

Another combination of techniques that is of interest is to perform equalization for both voltage DDJ and timing DDJ. Once again, there are different ways to proceed. As in the preceding paragraph, one could equalize for one, and then take that result as a new input to be equalized for the other. And, also as in the preceding paragraph, one could apply a Part VIII Voltage DDJ Correction Waveform (FIG. 10B) to a waveform already equalized for timing DDJ (having used whatever technique).

One particular combination seems quite attractive, however. That is to use filtered time shifted interpolation (FIGS. 8A-C) for equalizing timing DDJ (as it tends to leave the rise times of the asserted regions unaffected) and use a compensatory voltage waveform filtered with a UI-wide flat topped FIR Filter (FIG. 10B) for equalizing voltage DDJ (as that tends to leave the shape of the asserted regions unaffected). Say, for example, that we were confronted with a combination of ISI-produced timing DDJ (that produces no voltage error in the signal) and some voltage DDJ (which will produce both timing and voltage errors in the signal). For this combination it would be appropriate to NOT use a common Part I for each technique, and instead take the output of a complete voltage DDJ equalization process as the input to the timing DDJ equalization process.

Figure 11:
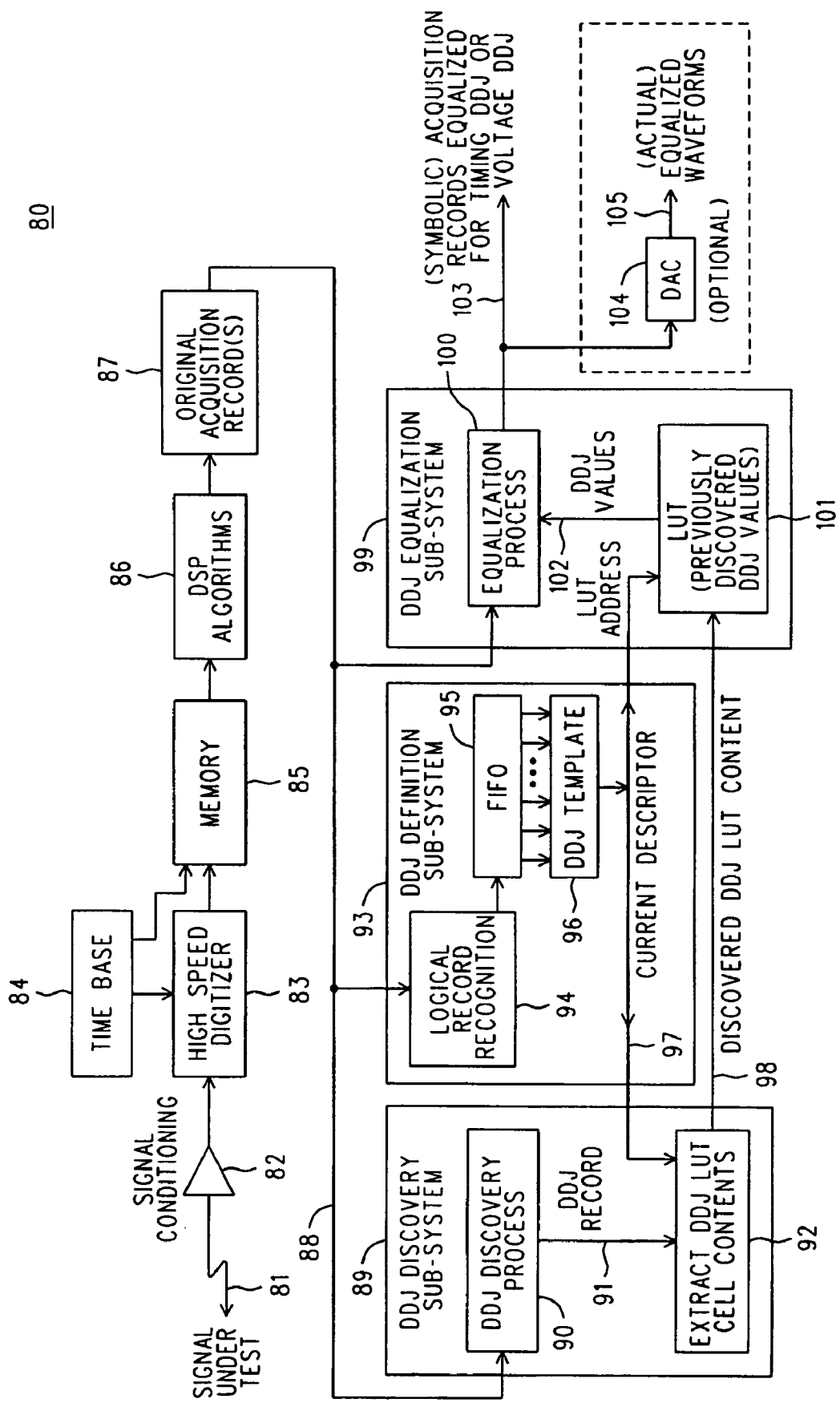
FIG. 11 is a simplified functional (i.e., for hardware or software) block diagram illustrating various aspects of DDJ equalization when performed within a Digital Sampling Oscillographic environment.

Finally, consider the functional block diagram 80 of FIG. 11. Block diagram 80 is for a Jitter Analysis System located within a DSO, and it will be appreciated that: (1) Those portions of the Jitter Analysis System that we shall call the DDJ Discovery Sub-System (89) and the DDJ Definition Sub-System (93) are exemplary items whose operation are described in the incorporated METHOD OF FINDING DATA DEPENDENT TIMING AND VOLTAGE JITTER IN AN ARBITRARY DIGITAL SIGNAL IN ACCORDANCE WITH SELECTED SURROUNDING BITS; and, (2) The depiction of a DSO as the host equipment is also merely exemplary, in that the Jitter Analysis System could be a stand-alone system in its own right, or, that it might be incorporated in some other type of test equipment different from a DSO.

In FIG. 11 a Signal Under Test 81 is probed and after Signal Conditioning (82) is applied to a High Speed Digitizer 83. It performs high speed analog to digital conversion with sufficient resolution (say, eight or ten bits) at a suitable rate. The Digitizer 83 operates in a periodic manner asynchronous with the data and in conjunction with a Time Base 84, such that the samples taken are supplied, along with an indication of when they occurred, as (voltage, time) pairs (or a sequence of voltages with implied times) to a Memory 85. We have suppressed all details connected with the issue of triggering, as what is shown is sufficient to support the notion of acquiring a waveform. The acquired waveform that is stored in the Memory 85 is processed by DSP Algorithms 86 to become a (stored Original) Acquisition Record 87 (which is also depicted in FIGS. 7, 8 and 10). An Original Acquisition Record is (among other things) formed into the various TIE/VLE Records as needed during processing for initial DDJ discovery by the Jitter Analysis System within the DSO.

An instance 88 of an Original Acquisition Record is applied to a DDJ Discovery Sub-System 89 and to a DDJ Definition Sub-System 93. These two sub-systems may operate together as described in METHOD OF FINDING DATA DEPENDENT TIMING AND VOLTAGE JITTER IN AN ARBITRARY DIGITAL SIGNAL IN ACCORDANCE WITH SELECTED SURROUNDING BITS to both define a schema for characterizing DDJ (the Template/Instance idea) and discover the values of DDJ that are, according to that schema, exhibited by the Signal Under Test 81. For the sake of completeness, we shall touch on these two sub-systems, although for the sake of brevity, do so only (very!) briefly.

The easiest place to begin is with the DDJ Definition Sub-System 93. This is the mechanism that allows for the 'data dependent' part of Data Dependent Jitter. To do this it has a Logical Record Recognition mechanism 94 that is responsive to the individual Original Acquisition Record(s) 88. Recall the discussion of Parts II and III of FIG. 7A. A FIFO 95 (First In First Out) storage device (whether actual hardware or an indexed memory data structure under control of an algorithm implemented in either firmware or software) accumulates the last several logical values exhibited by the data, which is then made available to the DDJ Template mechanism 96. It identifies and indicates (97) the current Descriptor occurring for the Template (schema) in use. A Descriptor will have an associated value of DDJ, although we won't know what it is until it has been discovered through a discovery (measurement) process.

Meanwhile, the same instance 88 of an Original Acquisition Record has also been applied to the DDJ Discovery Process 90 within the DDJ Discovery Sub-System 89. It produces a DDJ Record 91 that is applied, along with the Current Descriptor 97, to a process 92 that extracts the value of DDJ (98) associated with the current Descriptor. Presumably, the Original Acquisition Record was chosen to provide, or the original Test Data produced after sufficient time, at least one instance of every Descriptor that the Template defines, so that a complete description of DDJ will be found (i.e, a metric, or DDJ value, for each Descriptor).

In the example shown in FIG. 11 a LUT (Look-Up Table) 101 in a DDJ Equalization Sub-System 99 is used to store the discovered values of DDJ (98). To fill the LUT the DDJ Discovery Sub-System 89 and DDJ Definition Sub-System 93 would operate as described, and the Current Descriptor 97 would address the LUT 101 as the discovered DDJ values (metrics) are stored therein. At this point we are prepared to begin associating values of DDJ with events in the data, and can consider performing equalization.

(At earlier locations in this Specification we have indicated that a computational rule could take the place of storing discovered DDJ values in a Look-Up Table. The inputs to that computational rule would be the same as those used to decide what Descriptor of the Template is at hand, and its output would be computed DDJ values that match, or are very close to, the corresponding discovered DDJ values that would be stored in the LUT. Each needed instance of such a computed DDJ value is found via the rule—re-computed, as it were—each time it is to be used, which is to say, probably each time there is a new Descriptor. Finding the computational rule itself corresponds to the act of originally finding the discovered DDJ values that would otherwise be stored in the LUT. Using the computational rule to compute a DDJ value corresponds to retrieving a particular discovered DDJ value from the LUT. Which of these techniques is used to supply the Equalization Process 100 with DDJ values has no significant effect on the Equalization Sub-System 99 described below, other than as the source of DDJ values to be processed for equalization; the equalization task itself is not affected. The details of how to find the computational rule are not described herein, nor do we show an alternate version of FIG. 11 to accommodate the computational rule technique; such a figure would exhibit some minor changes. However, the existing FIG. 11 is believed to be entirely sufficient to support the Equalization Process 100 that has been described in connection with FIGS. 2-10. The internal specifics of the computational rule technique are expected to be the subject matter of a separate Application.)

Turning now to the actual equalization, the DDJ Equalization Sub-System 99 includes an Equalization Process 100 that is coupled to the Original Acquisition Record(s) 88 performs the desired equalization (per FIGS. 7, 8 or 10) by amounts specified by DDJ Values now read out of the LUT as the Original Equalization Record 88 is read (note that the DDJ Definition Sub-System is also getting the same Acquisition Record 88, and provides the Current Descriptor 97 that is used as a read-from address for the LUT.) It will thus be appreciated that the bock diagram 80 shown in FIG. 11 allows the equalization for DDJ of the Original Acquisition Record used to discover DDJ (which was probably a specially devised test pattern), or, of any Original Acquisition Record occurring after the DDJ Discovery Process has been satisfied (say, it is actual 'live' data occurring in an operating system). We might call this latter mode of operation a 'streaming' mode (new data is constantly being acquired, whether it is the same or different each time), as opposed to a 'static' mode for the former (one instance of acquiring test data).

If the sub-systems 93 and 99 are implemented in hardware, then simultaneous overlapped operation is possible (and desirable!) and it will be appreciated that any latency 88 to 97 must be matched or tolerated by the Equalization Process 100 (say, by a pipeline or other delay within the Equalization Process 100). It will be further appreciated that in a software or firmware embodiment (say, an embedded system in a DSO) this latency is less of an issue, as it amounts to creating/filling needed data structures BEFORE their content is used (a flow of control issue within a programmed environment), at the possible expense of a loss of or reduction in real-time responsiveness.

Lastly, we note that the output of the Equalization Process 100 is symbolic acquisition-style records 103 that are equalized for either timing DDJ or voltage DDJ, as specified to the DDJ Equalization Sub-System 99. They (103) are symbolic, in that they are formatted sequences of digitally expressed numbers, as opposed to actual time variant voltage waveforms. In principle, however, they (103) can be turned into exactly such time variant voltage waveforms 105 through their application to an optional DAC (Digital to Analog Converter).

We claim:

1. Within a measurement instrument, a method of removing data dependent jitter from a symbolic representation of a digital signal, the method comprising the steps of:
    (a) digitizing a digital signal of interest to create a sequence of sampled values there being a plurality of sampled values for each bit in the digital signal of interest;

(b) processing the sampled values of Step (a) to form an Acquisition Record that is a symbolic representation of the time variant behavior of the digital signal of interest;

(c) identifying, for each bit of the digital signal of interest whose time variant behavior is represented in the Acquisition Record of Step (b), a respectively associated amount of data dependent jitter that is known to be associated with each bit of the digital signal of interest;

(d) modifying the Acquisition Record of Step (b) to remove from the symbolic representation of each bit therein the respectively associated amount of data dependent jitter identified in Step (c) the respectively associated amount of data dependent jitter identified in Step (c) for a particular bit being removed by modifying more than one of the sampled values in the Acquisition Record; and (e) supplying to a using environment the modified Acquisition Record of Step (d).

2. A method as in claim 1 wherein the data dependent jitter is timing jitter and Step (d) further comprises the step of time shifted interpolation.

3. A method as in claim 2 wherein the step of time shifted interpolation further comprises the step of filtering the respectively associated amount of data dependent jitter of Step (c) to spread its effect over a selected transition portion of the each bit of the digital signal of interest with which the amount of data dependent jitter is associated.

4. A method as in claim 1 wherein the data dependent jitter is timing jitter and Step (d) further comprises the step of adding a compensatory waveform to the Acquisition Record of Step (b).

5. A method as in claim 4 wherein the step of adding a compensatory waveform further comprises the step of filtering the respectively associated amount of data dependent jitter of Step (c) to spread its effect over a selected transition portion of the each bit of the digital signal of interest with which the amount of data dependent jitter is associated.

6. A method as in claim 1 wherein the data dependent jitter is voltage jitter and Step (d) further comprises the step of adding a compensatory waveform to the Acquisition Record of Step (b).

7. A method as in claim 6 wherein the step of adding a compensatory waveform further comprises the step of filtering the respectively associated amount of data dependent jitter of Step (c) to spread its effect over a selected asserted portion of the each bit of the digital signal of interest with which the amount of data dependent jitter is associated.

8. A method as in claim 1 wherein Step (e) further comprising the step of applying the modified Acquisition Record to a Digital to Analog Converter to create an actual time variant voltage waveform.

* * * * *